(12) United States Patent
Langan et al.

(10) Patent No.: US 8,546,302 B2
(45) Date of Patent: Oct. 1, 2013

(54) FORMING RESIN SUBSTRATES USING DYE SUBLIMATION AND SUBSTRATES FORMED USING THE SAME

(75) Inventors: Wendy E. K. Langan, Harrisburg, PA (US); John E. C. Willham, Sandy, UT (US); Brent M. Burningham, Kaysville, UT (US)

(73) Assignee: 3form, Inc., Salt Lake City, UT (US)

( * ) Notice: Subject to any disclaimer, the term of this patent is extended or adjusted under 35 U.S.C. 154(b) by 0 days.

(21) Appl. No.: 13/445,507

(22) Filed: Apr. 12, 2012

(65) Prior Publication Data

US 2012/0196085 A1    Aug. 2, 2012

Related U.S. Application Data

(62) Division of application No. 12/596,131, filed as application No. PCT/US2008/069702 on Jul. 10, 2008, now Pat. No. 8,283,290.

(60) Provisional application No. 60/948,990, filed on Jul. 10, 2007, provisional application No. 60/987,998, filed on Nov. 14, 2007.

(51) Int. Cl.
*B41M 5/50* (2006.01)

(52) U.S. Cl.
USPC ........................................................ 503/227

(58) Field of Classification Search
None
See application file for complete search history.

(56) References Cited

U.S. PATENT DOCUMENTS

| | | | | |
|---|---|---|---|---|
| 4,778,782 | A * | 10/1988 | Ito et al. | 503/227 |
| 5,246,907 | A * | 9/1993 | Uytterhoeven | 503/227 |
| 5,264,410 | A * | 11/1993 | Beck et al. | 503/227 |
| 6,814,831 | B2 | 11/2004 | Drake | |
| 6,998,005 | B2 | 2/2006 | Magee | |
| 2005/0070434 | A1 | 3/2005 | Drake | |
| 2006/0028531 | A1 | 2/2006 | Magee | |
| 2007/0039682 | A1 | 2/2007 | Drake | |

FOREIGN PATENT DOCUMENTS

WO    2009009699    1/2009

* cited by examiner

*Primary Examiner* — Bruce H Hess
(74) *Attorney, Agent, or Firm* — Workman Nydegger

(57) ABSTRACT

Implementations of the present invention relate generally to methods, systems, and apparatus for manufacturing aesthetically pleasing, resin-based sheets including color and/or multi-decorated images. In particular, at least one implementation includes subjecting at least one surface of a polymer sheet to uniform heat and pressure in order to sublimate a dye into the surface, and ensure that that polymer sheet is not warped or otherwise damaged during processing. Additional implementations include decorative architectural resin panels including a resin sheet having a dye sublimated into one or more surfaces in order to create an effect of depth or other aesthetic.

29 Claims, 7 Drawing Sheets

FORMING RESIN SUBSTRATES USING DYE SUBLIMATION AND SUBSTRATES FORMED USING THE SAME

CROSS-REFERENCE TO RELATED APPLICATIONS

The present invention is a Divisional Application of U.S. National Stage application Ser. No. 12/596,131, which corresponds to PCT Application No. PCT/US08/69702, filed on Jul. 10, 2008, which claims the benefit of priority to U.S. Provisional Application No. 60/948,990, filed Jul. 10, 2007, entitled "Method and Apparatus for Dye Sublimation Printing on Polymer Substrate," and to U.S. Provisional Application No. 60/987,998, filed on Nov. 14, 2007, entitled "Method and Apparatus for Dye Sublimation Printing on Polymer Substrate." The entire content of the above-mentioned applications is incorporated by reference herein.

BACKGROUND OF THE INVENTION

1. The Field of the Invention

This present invention relates generally to decorative resin panels and processes, for use in decorative and/or structural architectural applications.

2. Background and Relevant Art

Recent trends in building design involve using one or more sets of decorative panels to add to the functional and/or aesthetic characteristics of a given structure or design space. These recent trends are due, at least in part, because there is sometimes more flexibility with how the given panel (or set of panels) is designed, compared with the original structure. For example, recent panel materials include synthetic, polymeric resin materials, which can formed as panels to be used as partitions, walls, barriers, treatments, décor, etc. Examples of such resin materials include polyvinyl chloride or "PVC"; polyacrylate materials such as poly (methyl methacrylate) or "PMMA"; polyester materials such as poly (ethylene-co-cyclohexane 1,4-dimethanol terephthalate), or "PET"; poly (ethylene-co-cyclohexane 1,4-dimethanol terephthalate glycol) or "PETG"; glycol modified polycyclohexylenedimethylene terephthalate; or "PCTG"; as well as polycarbonate; or PC materials.

In general, resin materials such as these are now popular compared with decorative cast or laminated glass materials, since resin materials may be manufactured to be more resilient and to have a similar transparent, translucent, or decorated appearance as cast or laminated glass, but with less cost. Decorative resins can also provide more flexibility compared with glass at least in terms of color, degree of texture, gauge, impact resistance, and ease of fabrication. One conventional method of coloring a resin panel includes adding colorants as the resin panel is extruded. Other techniques include the use of dye sublimation.

For example, dye sublimation involves first imparting an image or decorative design on a dyestuff (i.e., dye carrier) with sublimation inks. The image or decorative design is typically imparted on the dyestuff by an inkjet or a laser printer. After the image is imparted on the dyestuff, a manufacturer places the dyestuff on the substrate (object on which the image is to be printed). There are a number of different ways that the manufacturer can then sublimate the dye into the given substrate.

In one conventional example, the manufacturer places the assembly into an oven, and heats the assembly above the sublimation temperature of the dye and the glass transition temperature ("$T_g$") of the substrate. In this case, the manufacturer positions the assembly so that the oven's heat source provides heat directly to the side of the substrate to be decorated (i.e., via dye sublimation). In most if not all cases, the manufacturer also applies continuous pressure. Once the dye reaches its sublimation temperature, and the substrate has reached its $T_g$, the dye infuses into the substrate, thus imparting the intended image to the substrate. Thereafter, the manufacturer cools the assembly to a temperature below the $T_g$ of the substrate.

In another conventional process, the manufacturer uses vacuum bags or the like to aid in the distribution of pressure. For example, the manufacturer may place the dyestuff and substrate assembly into a vacuum bag. Similarly, a manufacturer can position a substrate and dyestuff within a pliable covering membrane that has dimensions greater than the substrate. In both cases, the manufacturer can then evacuate the air from the assembly. In the membrane example, the manufacturer evacuates air from the covering membrane through a perforated platen placed below the substrate. After removing pressure in this manner, the manufacturer then positions the vacuum bag assembly in an oven so that the oven's heat source applies heat primarily to the side of the assembly containing the dyestuff/dye carrier.

Unfortunately, each of the above-described conventional sublimation processes result in warping of the substrate to greater or lesser extents, even though prevention of warping is sometimes identified as an objective. One reason for this is that conventional methods and apparatus only or primarily heat one side of a given assembly at a time—the side on which sublimation is intended. Specifically, heating the substrate primarily or exclusively on one surface/side of a substrate can cause a non-uniform temperature gradient across the thickness or gauge of the substrate. Moreover, the effect of the uneven temperature gradient can be exacerbated when the manufacturer attempts to further sublimate dye into a second (e.g., opposing) side of the resin substrate. That is, when the manufacturer turns the resin substrate over to sublimate dye on another side of the resin substrate, the resin substrate will be subjected to an uneven temperature gradient for a second time. The renewed uneven temperature gradient on the additional, opposing side can further warp the overall panel as before, and still further distort the already-sublimated dye image on both the original side as well as on the new image side.

With relatively small and inexpensive plastic-based applications, such as photographic papers or films, thin plastic sheets, toys, or appliance components, the uneven temperature gradient in the substrate is not much of a concern, and the effects of the temperature gradient may not be too noticeable. This uneven temperature gradient, however, can be more problematic with higher-end, engineered thermoplastic substrates, that are much larger (e.g., 4' wide×8' long) and thicker (e.g., ¼", ½", and 1" gauge), such as those used as decorative architectural resin panels prepared with specific structural and aesthetic ends in mind for use in high-end building applications. Specifically, the resultant uneven temperature gradient experienced in sublimation printing of these higher-end substrates can cause disproportionate surface stresses in the resin panel, which ultimately can cause the resin panel to bow, warp, or curve. This particular warping from uneven heat can render the substrate unsuitable for its shape alone, especially when installed in a frameless application, not to mention unsuitability due to distortion of the image being sublimated.

In addition, the pressure created by the vacuum bag, or covering membrane on a platen, when combined with the heat needed to cause dye sublimation, tends to further deform the substrate by rounding the edges and corners of the substrate.

Specifically, conventional vacuum-based methods tend to result in pinching and subsequent rounding of the edges of the plastic substrate to conform to the contours of the vacuum bag or covering membrane. One will thus appreciate that there are thus multiple, significant disadvantages with applying conventional dye sublimation processes to substrates where flatness, surface uniformity, and optical properties such as image crispness and alignment are at a premium for at least these reasons.

In addition to these disadvantages, conventional methods can further require long processing times that may make such methods expensive or even commercially unviable for large architectural panels. For example, conventional methods typically involve heating and cooling the substrate within the same processing unit in order to keep the substrate under continuous pressure. Thus, a manufacturer usually needs to afford time to cool the processing unit, and then heat the processing unit up again in anticipation of processing the next substrate. Although conventional processing times for heating and cooling the same processing unit may be appropriate for smaller, thinner items, where many such items can be placed in the same unit, or where large-scale manufacturing is not a concern, such processing times would be inefficient and prohibitively costly for use with substrates that are much larger (e.g., 4' wide×8' long), and thicker (e.g., ¼"-1" thicknesses), particularly where large-scale manufacturing is desired.

Accordingly, there are a number of disadvantages in conventional methods for dye sublimation printing on resin substrates that can be addressed.

BRIEF SUMMARY OF THE INVENTION

Implementations of the present invention overcome one or more problems in the art with systems, methods, and apparatus for decorating resin-based substrates that can be used in high-end, decorative architectural applications. For example, implementations of the present invention can be used to efficiently color or decorate relatively large, resin-based substrates used in high-end, decorative architectural applications with dye sublimation techniques. In particular, implementations of the present invention can be used to create dye-sublimated panels, even with one or more differentially dye-sublimated sides/surfaces, albeit without the typically expected warping/distortion or edge-rounding to the panel or sublimated images. Implementations of the present invention further provide for the creation of such dye-sublimated panels using efficient and cost-effective, large-scale manufacturing techniques.

For example, a process of decorating a polymer substrate by employing dye sublimation techniques in accordance with at least one implementation of the present invention includes positioning at least one sublimation dye carrier about a polymer substrate that has opposing first and second surfaces. The process further includes applying equal heat and pressure uniformly and simultaneously to both the first and second opposing surfaces of the substrate, until a dye sublimates into and covers at least the entire first surface of the substrate. Furthermore, the resin substrate remains substantially rigid and has surface uniformity at all edges and corners.

In addition, a process of decorating a resin substrate in accordance with another implementation of the present invention involves placing a first sublimation dye layer against a first surface of a substrate and placing a second sublimation dye layer against an opposing second surface of the substrate. Heat and pressure is then uniformly and simultaneously applied to both the first and second opposing surfaces of the substrate until the first and second dye layers sublimate a depth into and cover the entire first and second opposing surfaces of the substrate. Finally, the first and second opposing surfaces of the substrate are cooled at the same rate.

Furthermore, a decorative architectural resin panel includes a resin sheet having a thickness defined by a distance that is perpendicular to first and second opposing surfaces. The panel also includes a first sublimated dye that covers the entire first surface, and extends by a first sublimation depth only partly into the thickness of the resin sheet. Similarly, the panel includes a second sublimated dye that covers the entire second major surface, and extends by a second sublimation depth only partly into the thickness of the resin sheet. The first and second sublimation depths are separated by a portion of the thickness of the resin sheet containing no sublimated dye.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention overcome one or more problems in the art with systems, methods, and apparatus for decorating resin-based substrates that can be used in high-end, decorative architectural applications. For example, implementations of the present invention can be used to efficiently color or decorate relatively large, resin-based substrates used in high-end, decorative architectural applications with dye sublimation techniques. In particular, implementations of the present invention can be used to create dye-sublimated panels, even with one or more differentially dye-sublimated sides/surfaces, albeit without the typically expected warping/distortion or edge-rounding to the panel or sublimated images. Implementations of the present invention further provide for the creation of such dye-sublimated panels using efficient and cost-effective, large-scale manufacturing techniques.

As understood more fully herein, implementations of the present invention provide methods capable of imaging decorative architectural laminate panels of about six feet by about fifteen feet (6'×15'), and more preferably about five feet by about ten feet (5'×10'), and further preferably about four feet by about eight feet (4'×8'), and about one-fourth inch (¼") to about two inch (2") gauge or thicker. In addition, implementations of the present invention can create such decorated panels in a manner that does not create a destructive temperature gradient across the gauge of the corresponding substrate. For example, implementations of the present invention provide one or more methods and apparatus that can be used to subject a substrate/dye sublimation assembly to uniform heat and pressure on any and all sides. The term "decorated" as used herein refers to an image, solid color, or color gradient, which generally comprises the entire surface area of the substrate to which it is applied.

Figure 1A:
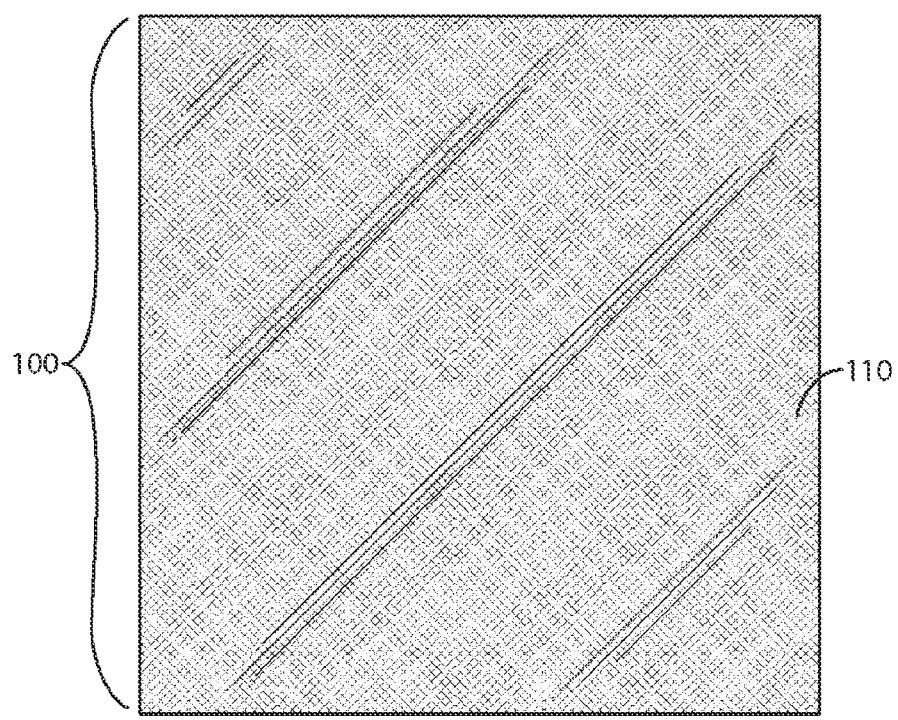
FIG. 1A illustrates a plan view of a surface of a decorative architectural resin panel that has been decorated by means of dye sublimation in accordance with an implementation of the present invention.
Figure 1B:
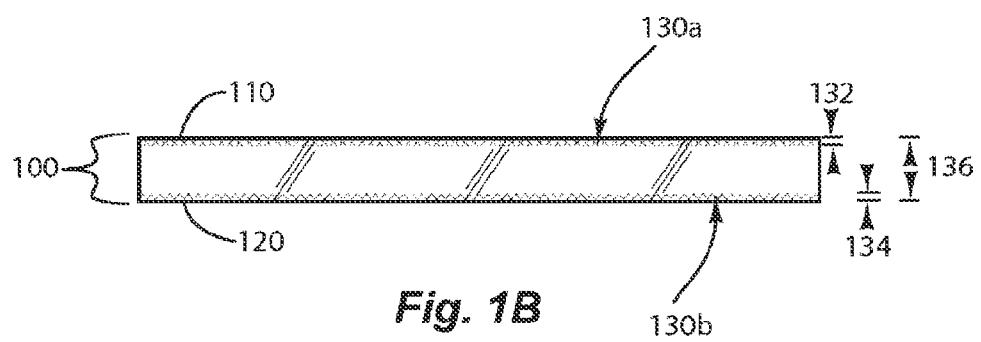
FIG. 1B illustrates an end view of the panel of FIG. 1.

FIGS. 1A-1B illustrate an implementation of a decorative architectural resin panel 100 prepared in accordance with the principles of the present invention. For example, FIG. 1A illustrates that a decorative architectural resin panel 100 includes a resin-based substrate having at least one surface 110 that has been decorated via inventive dye sublimation techniques. FIG. 1B further illustrates an end view of the decorative architectural resin panel 100 shown in FIG. 1A, showing that, in this example, both sides 110 and 120 have been decorated.

As used herein, the terms "resin-based substrate," "resin substrate," "polymer-based substrate," "polymer substrate," "resin-based sheet" or "resin sheet" means a substrate comprising materials of one or more layers or sheets formed from any one of the following thermoplastic polymers (or alloys thereof). Specifically, such materials include but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), or the like. Such materials can also include other thermoplastic polymers or thermoplastic polymer blends that can sufficiently be heated above their glass transition temperature ($T_g$), imparted with a sublimated dye, and then subsequently cooled to solid form. In addition, any given resin substrate or sheet can include one or more resin-based substrates and any number other layers or coatings.

For example, the decorative architectural resin panel 100 shown in FIGS. 1A-1B includes a single resin-based substrate. One will appreciate, however, that the decorative architectural resin panel 100 can alternatively comprise a laminate of multiple resin-based substrates of the same or different materials described above. The decorative architectural resin panel 100 can also vary in thickness to include a range from relatively thin gauge films to thicker gauge sheets (e.g., greater than about one-sixteenth inch (¹⁄₁₆") to about 5 inches (5")). For example, in some implementations, the gauge of the decorative architectural resin panel 100 in at least one implementation can be anywhere from about one-sixteenth inch (¹⁄₁₆") to about two inches (2") inches. The thickness of the decorative architectural resin panel 100 can be based at least partially on the number of resin-based substrates it comprises, as well as the desired end-use.

In any event, FIG. 1A shows that resin panel 100 comprises a first surface 110 that has been decorated with dye sublimation methods of the present invention. Thus, the surface 110 has an aesthetic effect provided by its color or image. In some implementations, for example, the color of the surface 110 and the finalized decorative architectural resin panel 100 can be opaque. In other implementations, the color of the surface 110 can be transparent or translucent. Indeed, as explained in further detail below, the color and opacity/translucence of the surface 110 can be modified in any number of ways to adjust the opacity/transparency of the decorative architectural resin panel 100 for desired aesthetic effect. For instance, in at least one implementation, a manufacturer can modify the hue, color intensity, and light transmission of the dye used in a dye carrier to vary the resultant aesthetic properties of the decorative architectural resin panel 100.

Along these lines, the manufacturer can also vary the amount (i.e., total area) of the surface 110 to be decorated for similar variations in aesthetic effects. For example, FIG. 1A shows that the decorative architectural resin panel 100 has a surface 110 that is entirely decorated (i.e., the entire surface area is infused with color). Of course, in additional or alternative implementations, the manufacturer can decorate only a portion of the surface 110 to form an image or decorative design. Similarly, according to some implementations, the manufacturer can sublimate one color onto the majority of surface 110 (as shown), and simultaneously sublimate additional colors in the rest of the surface, such as to form an image or design. In yet further implementations, the entire surface 110 can be decorated using multiple colors to form an image or design. Additionally, the manufacturer can sublimate dye into more than one surface of the decorative architectural resin panel 100. For example, FIG. 1B shows that the decorative panel 100 of FIG. 1A also has dye sublimation on the opposing surface 120 thereof.

One will appreciate that decorating opposing sides 110, 120 of the decorative architectural resin panel 100 can provide a great deal of aesthetic versatility. For example, a manufacturer can print an image on surface 110 and a complementary image on opposing surface 120. Similarly, a manufacturer can print an image on surface 110 and can also print the same image on surface 120, albeit offset or larger than the image on surface 110 to create an effect of depth. In one or more additional or alternative implementations, a designer or manufacturer can intend surface 120 be the reverse side of a finished product, and can sublimate a solid color thereon. The manufacturer can then sublimate an image on surface 110 in order to create an effect of depth or dimensionality. Furthermore, in additional implementations, the manufacturer can decorate the surface 110 and the surface 120 to have a color-to-color or color-to-clear faded image covering substantially the entire surface area of at least one of the upper surface 110 or lower surface 120. One will appreciate that many different modifications can be made to obtain varying desired aesthetic effects. In the illustrated implementation, however, FIGS. 1A and 1B show that a manufacturer sublimates dye into the entire surface area of the two opposing surfaces. For example, FIG. 1B illustrates a first dye or dye layer 130*a* that has been infused into surface 110 and a second dye or dye layer 130*b* has been infused into opposing surface 120.

In addition, FIG. 1B shows that, the dye layer 130*a* has been infused or sublimated into surface 110 to a first sublimation depth or distance 132, and similarly, the dye layer 130*b* has been sublimated into opposing surface 120 to a second sublimation depth or distance 134. FIG. 1B also shows that panel 100 comprises a gauge/thickness 136 defined by the shortest perpendicular distance between opposing surfaces 110 and 120, and that the dye layer depths 132, 134 do not span the entire panel 100 thickness 136. Thus, one will appreciate that the distances 132, 134 to which the dyes 130*a*, 130*b* are sublimated into the surfaces 110, 120 can comprise only a portion of the total thickness or gauge 136 of the decorative architectural resin panel 100. In most cases, these dye sublimation depths will be only a few microns (i.e., thousandths of an inch).

In at least one implementation, the un-sublimated portion of the gauge 136 between the dye layers 130*a*, 130*b* can comprise the majority of the total thickness or gauge 136 of the decorative architectural resin panel 100. For example, the combined sublimation depths 132, 134 might comprise less than about one-fifth (1/5) of the thickness or gauge 136 of the decorative architectural resin panel 100. In such a case, a one-inch thick substrate might have two opposing surfaces that are several microns thick with dye sublimation portions (e.g., 130*a*, 130*b*), but no more than one-thirty-second inch (1/32") in either sublimation portion. Thus, the combined sublimation depths 132, 134 of the sublimation portions 130*a*, 130*b* might be no more than one-sixteenth (1/16) of the total thickness 136 in combination, leaving fifteen-sixteenths (15/16) of the panel 100 thickness 136 "un-sublimated." For example, FIG. 1B further shows that the thickness 136 includes an un-sublimated portion such that the dye layers 130*a*, 130*b* do not touch or overlap.

One will appreciate, therefore, that a manufacturer can vary the dye sublimation depths 132, 134 particularly with respect to the overall thickness 136 for a variety of effects, such as to vary the translucency, hue, and other aesthetic effects for decorative architectural resin panel 100. In one implementation, for example, the combined sublimation depths 132, 134 comprise between approximately one-tenth (1/10) and one-hundredth (1/100) of the total thickness 136 of the decorative architectural resin panel 100. In another implementation, the combined sublimation depths 132, 134 comprise a total distance equal to less than one-hundredth (1/100) of the total thickness 136 of the decorative architectural resin panel 100. One will also appreciate that the manufacturer can vary the sublimation depths 132, 134 in opposing surfaces 110, 120 to also vary the durability of the intended aesthetic. For example, the manufacturer may impart deeper dye sublimation depths to ensure that the imparted color is not worn off by wear or touch, at least for an extended period of time.

Figure 2A:
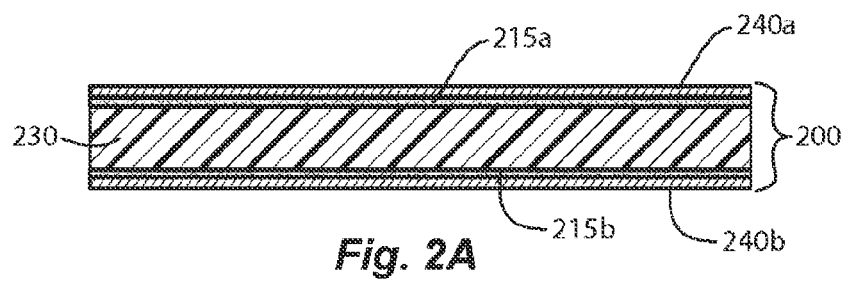
FIG. 2A illustrates a cross-sectional view of a dye-sublimation sheet assembly for use in accordance with an implementation of the present invention.
Figure 2B:
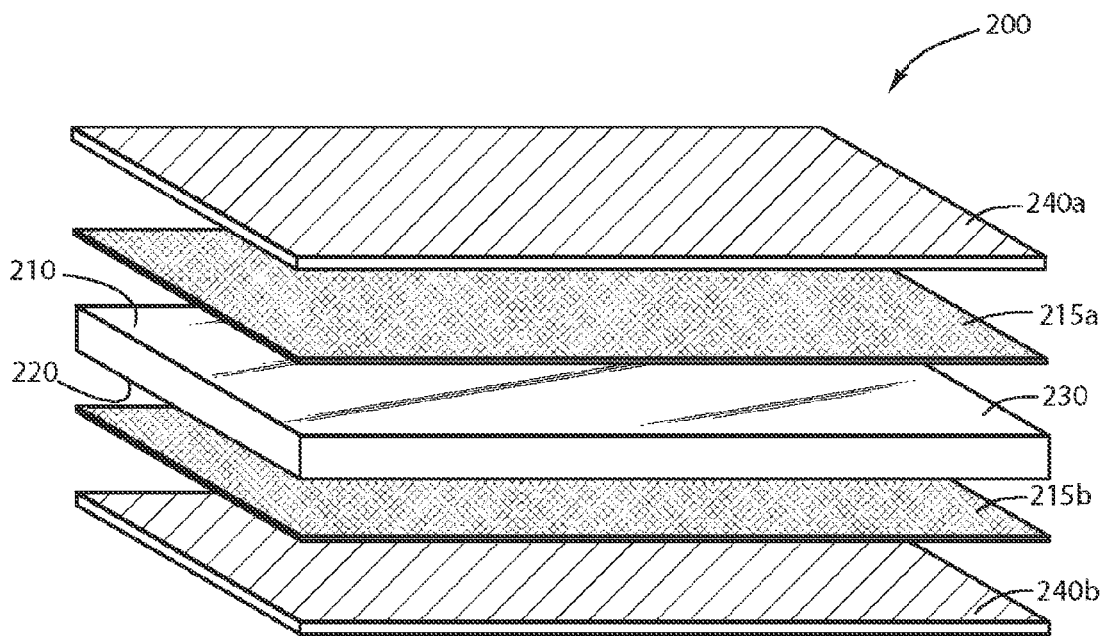
FIG. 2B illustrates an exploded perspective-view of the dye-sublimation sheet assembly of FIG. 2A in accordance with an implementation of the present invention.

FIG. 2A illustrates an overview of a sublimation sheet assembly 200 for use as a precursor in creating a decorative architectural resin panel 100, which has one or more dye-sublimated surfaces. Similarly, FIG. 2B illustrates an exploded view of the components of the sublimation sheet assembly 200 in FIG. 2A, albeit rotated by ninety degrees (90°). In particular, FIGS. 2A-2B illustrate a sequential overview in accordance with an implementation of the present invention for positioning components of the sublimation sheet assembly 200 prior to subjecting the components to a dye sublimation process.

For example, FIGS. 2A-2B illustrate that a sublimation sheet assembly 200 in accordance with an implementation of the present invention can include a resin-based substrate or sheet 230 including opposing top 210 and bottom 220 surfaces. At least one of the top 210 and bottom 220 surfaces can be configured to be decorated. The resin-based substrate 230 can be formed from any of the materials described herein above in defining "resin-based," and can be translucent or transparent. Additionally, the resin-based substrate 230 can comprise a laminate of multiple layers of the same or different compatible materials.

Furthermore, the resin-based substrate 230 can be any appropriate thickness for the resulting thickness of a final decorative architectural resin panel 100, such as about two inches (2"), about one inch (1"), about one-half inch (1/2"), about one-fourth inch (1/4"), about one-eighth inch (1/8"), about one-sixteenth inch (1/16"), or about one-thirty-second inch (1/32") in thickness or gauge as desired. The size (i.e., surface area of side 110 or 120) of the resin-based substrate 230 can also be any appropriate size for the resulting size of the final decorative architectural resin panel 100. In at least one implementation, for example, the resin-based substrate 230 can be about four feet by about eight feet (4'×8'), about four feet by about ten feet (4'×10'), about six feet by about fifteen feet (6'×15'), or taller/wider. Or alternatively, the resin-based substrate 230 can be about six inches by about six inches (6"×6") or shorter/skinnier. Thus, both the gauge and size of the resin-based substrate 230 can be tailored depending upon the desired dimensions of a final decorative architectural resin panel 100.

FIGS. 2A-2B also depict that the sublimation sheet assembly 200 can include one or more dye layers or carriers placed next to, or against, one or more surfaces 210, 220 of the resin-based substrate 230 intended to be decorated. For example, FIGS. 2A-2B illustrate that when processing a sublimation sheet assembly 200, a manufacturer can place a first dye carrier 215*a* on top of surface 210 of the resin-based substrate 230, and also optionally place a second dye carrier 215*b* below the bottom surface 220 of the resin-based substrate 230. Each dye carrier 215*a*, 215*b* can, in turn, bear an image or solid color produced from sublimation dyes. As used herein the term "sublimation dye(s)" refers to any dye capable of sublimation into a resin substrate with the heat and pressures described herein. Specifically, any dye that, upon application of heat, sublimates directly from a solid state to a vapor state. As shown in FIGS. 2A-2B, the dye carriers 215*a*, 215*b* can each cover substantially the entire surface 210, 220 of the resin-based substrate 230 against which they are placed. The dye carries 215*a*, 215*b* can cover the entire surface 210, 220 to be decorated to ensure that the entire surface area of each surface 210, 220 is infused with dye or color.

Optionally, the sublimation sheet assembly 200 can further include one or more pressure distribution plates. For instance, FIGS. 2A-2B illustrate that a manufacturer can construct the sublimation sheet assembly 200 with two pressure distribution plates 240a, 240b. Furthermore, as FIGS. 2A-2B illustrate that the pressure distribution plates 240a, 240b can comprise the outermost or extreme layers of the sublimation sheet assembly 200. For example, FIGS. 2A-2B illustrate that a manufacturer can place a first pressure distribution plate 240a on top of the first dye carrier 215a (i.e., adjacent the surface of the dye carrier 215a opposite the surface placed upon the resin-based substrate 230). Furthermore, the manufacturer can also position a second pressure distribution plate 240b below the second dye carrier 215b. In at least one implementation of the present invention, the pressure distribution plates 240a, 240b provide a buffer or barrier between the dye carriers 215a, 215b and the platens (FIG. 4) of a thermosetting press, or other apparatus used to impart pressure and heat to the sublimation sheet assembly 200. The pressure distribution plates 240a, 240b can also aid in distributing temperature, as well as pressure, evenly across the surfaces of the sublimation sheet assembly 200.

In at least one implementation, the pressure distribution plates 240a, 240b can comprise metal sheets, such as steel or aluminum. Because the pressure distribution plates 240a, 240b may be subjected to repeated stresses from continual direct contact with press platens (FIG. 4), the pressure distribution plates 240a, 240b may not be perfectly flat. Accordingly, in some implementations, the sublimation sheet assembly 200 can further include a soft, albeit heavy duty, pressure pad (not shown) between each pressure distribution plate 240a, 240b and dye carrier 215a, 215b. The pressure pads can comprise a compressible fabric prepared from copper, silicone, or NOMEX, or a combination of the proceeding. NOMEX is an aramid fabric available from DuPont de Numours, E.I. & Company. One will appreciate that the sublimation sheet assembly 200 can also include other layers in addition to the pressure pads that are not shown in FIGS. 2A-2B. For instance, a manufacturer can include texture layers and/or additional matting layers as appropriate.

FIGS. 2A-2B further illustrate that a manufacturer can build the sublimation sheet assembly 200 so it is essentially symmetrical about it center layer, which in FIGS. 2A-2B is the resin-based substrate 230. For example, the manufacturer can place a dye carrier 215a and then a pressure distribution plate 240a on top of the resin-based substrate 230. Then the manufacturer can place the same layers, albeit in reverse order, below the substrate—a dye carrier 215b and then a pressure distribution plate 240b. Of course, due to the relative thinness of any given dye layer 215a, the sublimation assembly 200 will also be essentially symmetrical using the substrate 230, opposing pressure distribution plates 240(a-b), but only one dye carrier sheet 215a.

In any event, and as explained in greater detail below, by ensuring that the sublimation sheet assembly 200 is symmetrical about its center layer, the manufacturer can ensure heat will transfer evenly and uniformly into the center of the assembly 200 from both sides 210, 220. Specifically, a symmetrical sublimation sheet assembly 200 is at least one way in which a manufacturer can avoid creating a non-uniform temperature gradient across the thickness (e.g., 136) of the resin-based substrate 230. As previously mentioned, elimination of an uneven temperature gradient is at least one way that the manufacturer can create a dye-sublimated panel without the otherwise attendant warping, bowing, or bending at these sizes (e.g., 5'×10' or 4'×8') and gauges (e.g., as much as 1-5").

Figure 3A:
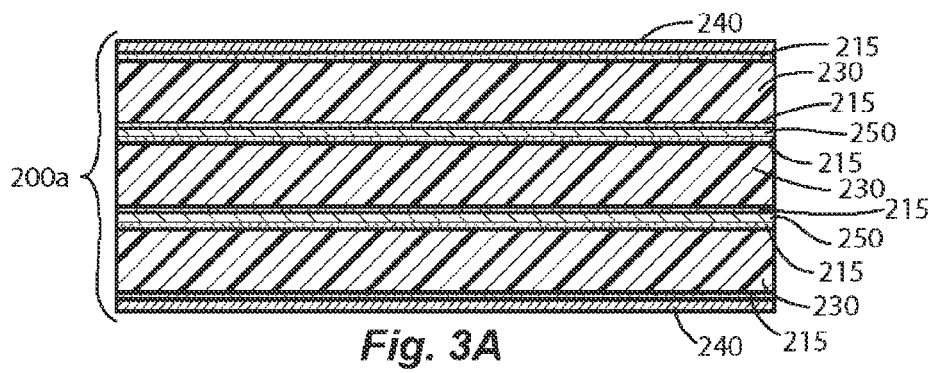
FIG. 3A illustrates a cross-sectional view of a multi-layered dye-sublimation sheet assembly in accordance with an implementation of the present invention.
Figure 3B:
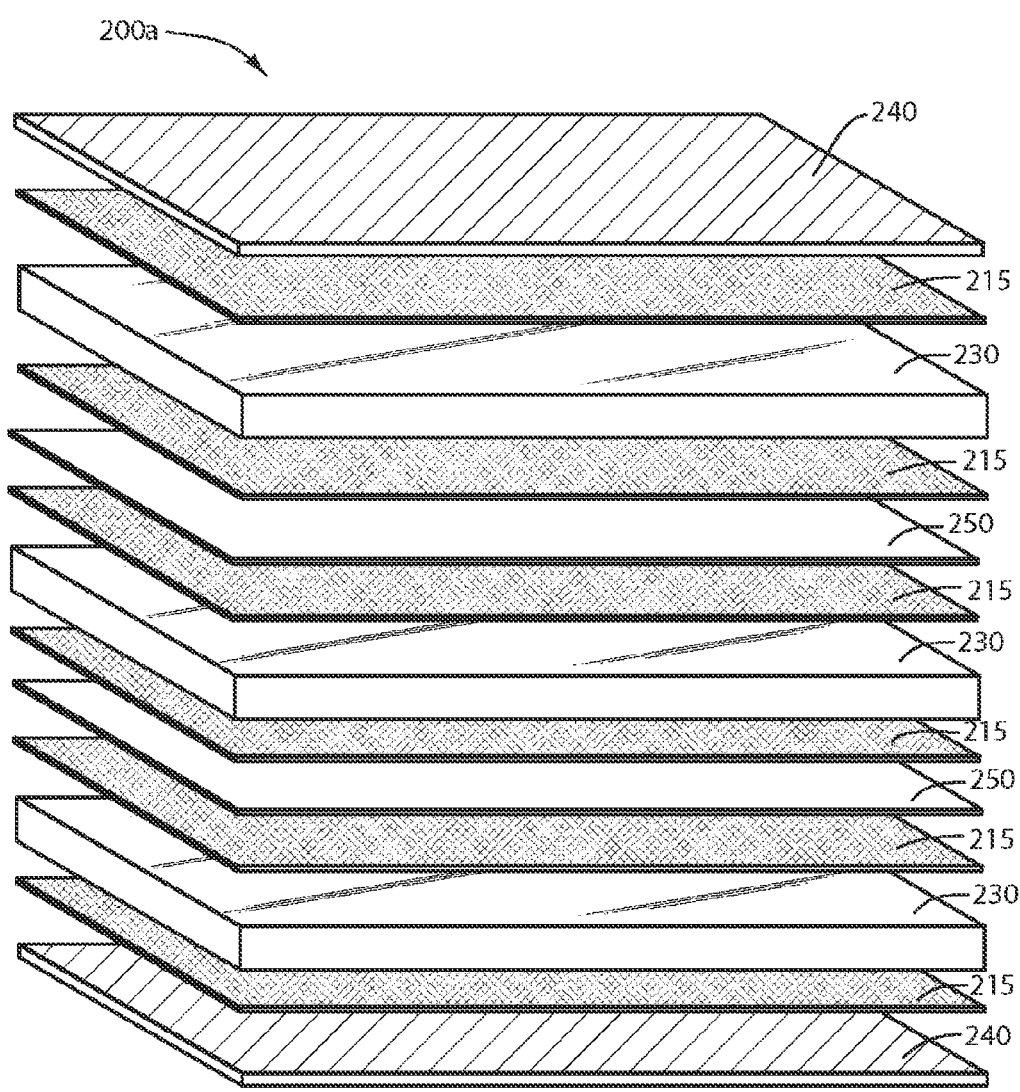
FIG. 3B illustrates an exploded perspective-view of the multi-layered dye-sublimation sheet assembly of FIG. 3A in accordance with an implementation of the present invention.

In addition, while the sublimation sheet assembly 200 illustrated in FIGS. 2A-2B depicts a single resin-based substrate 230 to be decorated, one will appreciate that the sublimation sheet assembly 200 can include multiple resin-based substrates to be decorated and thus multiple dye carriers. For example, FIGS. 3A-3B illustrate another implementation of a sublimation sheet assembly 200a that includes three separate resin-based substrates 230. In particular, FIG. 3A illustrates an overview of a sublimation sheet assembly 200a for use as a precursor in creating multiple decorative resin-based panels 100 that each have one or more dye-sublimated surfaces. Similarly, FIG. 3B illustrates an exploded view of the components of the sublimation sheet assembly 200a in FIG. 3A, albeit rotated by ninety degrees (90°).

As shown in FIGS. 3A-3B, a manufacturer can place a dye carrier 215 against one or more surfaces of each resin-based substrate 230 to be decorated. For example, FIGS. 3A-3B illustrate a dye carrier 215 against both surfaces of each resin-based substrate 230; however, as previously mentioned, one will appreciate that a dye carrier can only be placed against one surface of one or more of the resin-based substrates 230. Furthermore, a manufacturer can separate any abutting dye carriers 215 with separation sheets 250. The separation sheets 250 can ensure that the dye from adjacent carriers do not bleed into each other or sublimate into surfaces of the resin-based substrates 230 that are not intended to be decorated.

The separation sheets 250 can comprise a glass plate, metal sheet, plastic sheet, paper layer, or other layer that is capable of separating the dye carriers 215. Furthermore, just as with the sublimation sheet assembly 200, the extreme layers of the sublimation sheet assembly 200a can comprise pressure distribution plates 240. Still further, the sublimation sheet assembly 200a can also include other layers not shown in FIGS. 3A-3B, such as, for instance, pressure pads, texture layers, and/or additional matting layers as appropriate. The illustrated sublimation assembly 200a of FIGS. 3A-3B, therefore, provides for multiple surfaces of multiple resin-based substrates 230 to be printed by dye sublimation simultaneously. One will appreciate that the sublimation sheet assembly 200a can increase production capacity and reduce production time and expenses. This increase in production capacity is in addition to the increase provided by simultaneously coloring or printing on opposing sides of a resin-based substrate 230 with dye sublimation techniques in accordance with implementations of the present invention.

In addition, FIGS. 3A-3B illustrate that, similar to the sublimation sheet assembly 200, the sublimation sheet assembly 200a can be essentially symmetrical about its center layer (i.e., the middle resin-based substrate 230). As before, such symmetry is based primarily on the number and arrangement of pressure plates 240 and/or pressure pads about the given substrate(s) 230, but virtually regardless of the number of dye carriers 215 per substrate 230. As mentioned, this essentially symmetrical arrangement can ensure heat will transfer evenly and uniformly in from both extreme layers to the center of the assembly. Specifically, the symmetrical sublimation sheet assembly 200a can provide dye sublimation to the resin substrates 230, without any warping, bowing, or bending that a non-uniform temperature gradient may cause.

Figure 4:
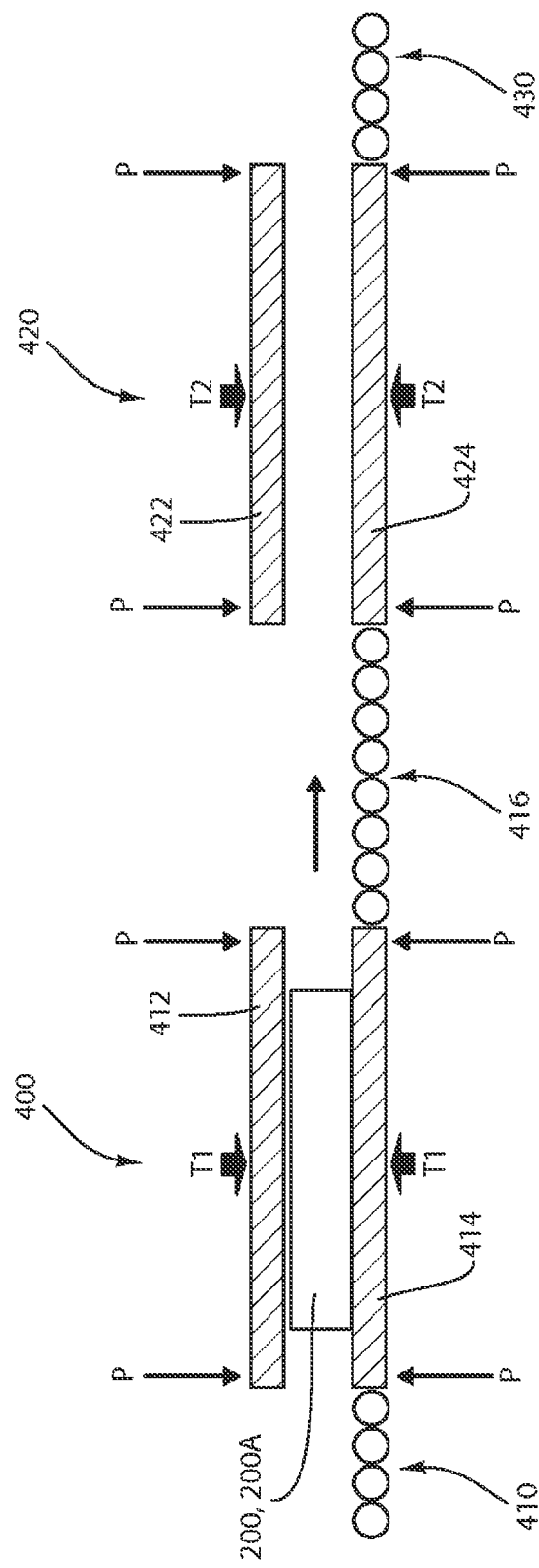
FIG. 4 illustrates a schematic view of a system including two presses arranged in series that can be used to process dye-sublimation sheet assemblies in accordance with an implementation of the present invention.

FIGS. 4-7 and the corresponding text illustrate or describe a number of different ways in which a manufacturer can provide the appropriate heat and pressure to the sublimation sheet assemblies 200/200a. For example, FIG. 4 illustrates that a manufacturer can place a sublimation sheet assembly 200/200a within a first thermosetting environment 400 (e.g., a thermosetting press) using an in-feed roller table 410. The first thermosetting environment 400 can comprise upper and lower platens 412, 414. In at least one implementation, the upper and lower platens 412, 414 comprise isothermal platens. Additionally, one will appreciate virtually any size of platens 412, 414 and thermosetting environment 400 can be used in order to handle virtually any size or dimension of sublimation sheet assembly 200/200a.

In general, the upper and lower platens 412, 414 are configured to provide direct heat and pressure to both opposing sides of the given sublimation sheet assembly 200/200a. For example, FIG. 4 shows that the manufacturer has placed the sublimation sheet assembly 200/200a within the first thermosetting environment 400. The manufacturer can then close the upper and lower platens 412, 414 around the sublimation sheet assembly 200/200a to apply the appropriate temperatures and pressures described herein. Specifically, FIG. 4 illustrates that both the upper and lower platens 412, 414 apply pressure P and temperature T1 to the sublimation sheet assembly, and thus, ultimately in two opposing directions toward the intermediate layers of the sublimation sheet assembly 200/200a.

As used herein the term "temperature T1" means a temperature sufficient to sublimate the printed dyes into a resin-based substrate. Thus, the term "temperature T1" means a temperature that is above the dye sublimation temperature of the dye and above the $T_g$ of the resin-substrate being decorated. By contrast, as used herein, the term "pressure P" means a pressure sufficient to provide the needed contact force between a dye carrier and a surface of a substrate to allow the dye to sublimate into the surface, and also to evacuate air between the dye carrier and surface of the substrate being decorated.

In at least one implementation, temperature T1 is between about 350° F. and about 450° F., preferably between about 375° F. and about 425° F. One will appreciate, therefore, that varying resins can have a wide range of glass transition temperatures, and thus, T1 can vary depending on which resins are used. For example, in an implementation using dyes with a dye sublimation temperature that is less than the $T_g$ of the resin-substrate being decorated, the final temperature T1 of the resin material may vary for materials such as polycarbonate, acrylic, and copolyesters (e.g., PETG, PET, and PCTG). In other implementations, however, the sublimation temperature of the dye is higher than the glass transition temperature for materials, and thus a manufacturer will ordinarily use the same temperature T1 for each such material. A similar effect can be observed with respect to pressure. For example, in at least one implementation, the manufacturer can implement a pressure P that is between approximately 5 pounds per square inch (psi) and approximately 250 psi, and preferably between about 5 psi and about 50 psi for each such material.

Regardless of the specific temperature chosen for the given material, where applicable, the platens 412, 414 can heat the sublimation sheet assembly 200/200a to a temperature T1 above the material $T_g$ and dye sublimation temperature. According to at least one implementation of the present invention, it is important that only the outer surfaces 210, 220 of the resin-based substrate 230 are heated sufficiently above the $T_g$, and not necessarily the entire gauge or thickness of the resin-based substrate 230. Furthermore, to ensure only the outer surfaces reach the $T_g$, a manufacturer can hold the sublimation sheet assembly 200/200a at temperature T1 for a period of about 30 seconds to about 5 minutes. More preferably, the manufacturer can hold the sublimation sheet assembly 200/200a at temperature T1 for between approximately 1 to 2 minutes.

In at least one implementation of the present invention, temperature T1 is applied through contact with both upper and lower platens 412, 414 uniformly and simultaneously to the sublimation sheet assembly 200/200a. One will appreciate that heating the sublimation sheet assembly 200/200a, and thus the resin-based substrate 230, from both sides (with isothermal platens) can generally eliminate any uneven temperature gradient across the thickness or gauge of the resin-based substrate 230 that might otherwise occur from single-side heating. Thus, simultaneously and uniformly heating both the upper and lower surfaces 210, 220 of the resin-based substrate 230 can provide a substantially even temperature distribution through the thickness or gauge of the resin-based substrate 230.

As previously mentioned, this is due at least in part because the sublimation sheet assembly 200/200a is symmetrical about its center layer as explained above. Thus, the rate of heat transfer from the opposing extreme layers to the center of the sublimation sheet assembly 200/200a will be substantially equal. Furthermore, to the extent any temperature gradient is present, as the resin-based substrate 230 warms to processing temperature T1, it is expected that the temperature of the opposite surfaces 210, 220 of the resin-based substrate 230 will be uniform across the cross-section of the substrate 230 (both parallel and normal to the substrate surface). In particular, it is anticipated that the entire sublimation sheet assembly 200/200a can achieve temperatures sufficient to transfer a sublimated image (graphic, solid color, or color gradient) during the process.

In addition to heating and holding the sublimation sheet assembly 200/200a at temperature T1, while in the first thermosetting environment 400, the platens 412, 414 can apply a pressure P to the sublimation sheet assembly 200/200a to help ensure uniform sublimation and removal of air between the dye carrier and the substrate. In particular, the platens 412, 414 can apply pressure P to ensure proper contact between the one or more dye carriers 215 and the resin-based substrate 230.

Uniformly and simultaneously heating and pressing both opposing sides of the sublimation sheet assembly 200/200a can thus ensure that any resin-based substrate 230 therein does not warp, bow, and/or bend during processing. This can ensure that each image being sublimated into the one or more surfaces of each resin-based substrate 230 is not offset or otherwise distorted from its intended position. Furthermore, this can ensure no corners or edges are deformed and that the entire resin-based substrate 230 can be used as part of a finished decorative architectural resin panel 100. This is particularly, beneficial considering the cost of the material used to produce high-end decorative architectural resin panels 100.

Figure 5A:
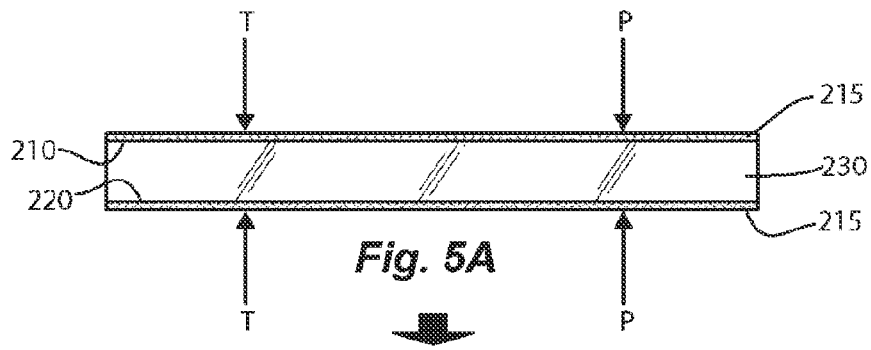
FIGS. 5A-D illustrate a sequence of physical changes in a dye-sublimation sheet assembly when the dye-sublimation sheet assembly undergoes temperature and pressure applications in accordance an implementation of the present invention.
Figure 5B:
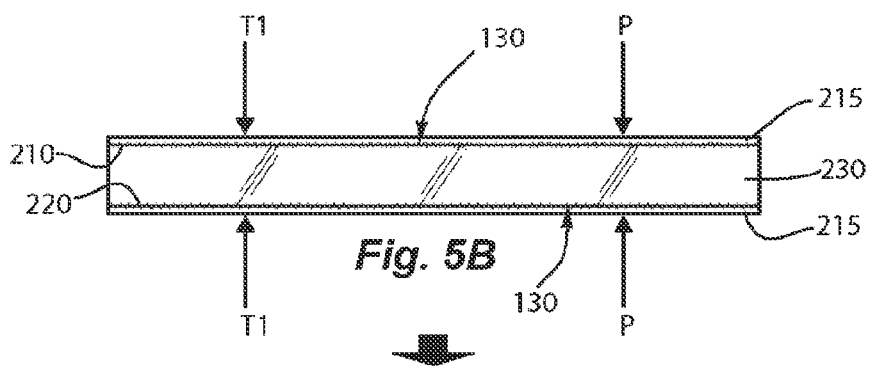
Figure 5C:
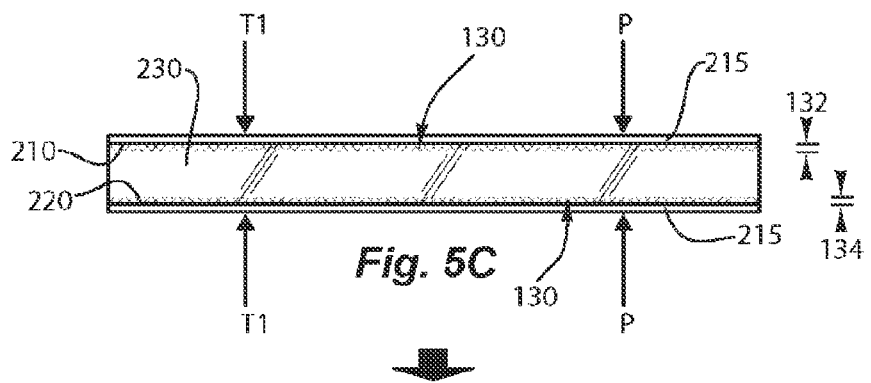
Figure 5D:
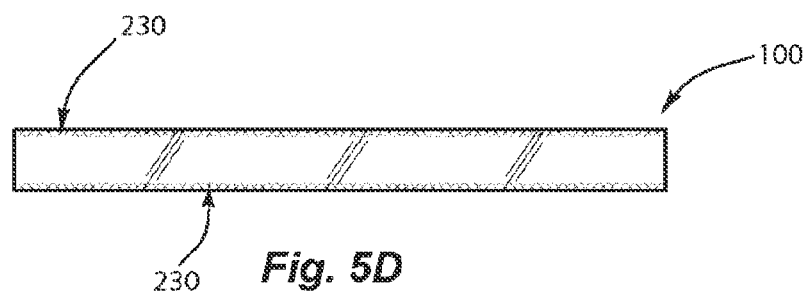

FIGS. 5A-5C illustrate a sequence of physical changes in a resin-based substrate 230 when it is subjected to pressure P and temperature T1. For example, FIG. 5A illustrates an end view of a resin-based substrate 230 with dye carriers 215 placed against its opposing upper and lower surfaces 210, 220. As shown in FIG. 5A, pressure P and temperature T1 can be applied simultaneously and uniformly to both the upper and lower surfaces 210, 220 of the resin-based substrate 230 and the dye carriers 215.

FIG. 5B illustrates the changes that the substrate 230 and dye 130 can undergo as the temperature of the resin-based substrate 230 and the dye carriers 215 reaches T1 (i.e., a temperature above the sublimation temperature of the dye carriers 215 and the glass transition temperature of the substrate 230). In particular, FIG. 5B illustrates that once the dye 130 from the dye carriers 215 reaches temperature T1, and the resin-based substrate 230 is above its $T_g$, the dye 130 begins to sublimate into the opposing upper and lower surfaces 210, 220 of the resin-based substrate 230. For example, as the dye 130 reaches its sublimation temperature, it changes from a solid to a vapor state and sublimates or infuses into the surfaces 210, 220 of the resin-based substrate 230.

By contrast, FIG. 5C illustrates what occurs once the resin-based substrate 230 and dye carriers 215 have been held at temperature T1 and pressure P for the proper amount of time. Specifically, FIG. 5C shows that the dye 130 has sublimated into the upper and lower opposing surfaces 210, 220 to a first and second sublimations depths 132, 134. One will appreciate that the first and second sublimation depths 132, 134 can be controlled by the amount of time the dye carriers 215 and the resin-based substrate 230 are held at temperature T1 and pressure P.

According to one implementation of the present invention, once the dye 130 has sublimated into the upper and lower surfaces 210, 220 of the resin-based substrate 230 to desired sublimation distances 132, 134, a manufacturer can remove the sublimation sheet assembly 200/200a from the thermosetting environment 400. For example, as shown in FIG. 4, a manufacturer can slide the sublimation sheet assembly 200/200a across a set of inter-press rollers 416, as indicated by the arrow, into a second thermosetting environment 420. The second thermosetting environment 420 can cool the sublimation sheet assembly 200/200a to a release temperature T2. The second thermosetting environment 420 can uniformly and simultaneously apply temperature T2 to opposing sides of the sublimation sheet assembly 200 to ensure that a temperature gradient is not created between the opposing sides of the sublimation sheet assembly 200 during cooling.

Thus, in at least one implementation of the present invention, all pressure can be released from the sublimation sheet assembly 200/200a as it is transferred from a first thermosetting environment 400 to a second thermosetting environment 420. In other words, according to at least one implementation of the present invention, the sublimation sheet assembly 200/200a is not subjected to continuous pressure during the entire dye sublimation process. That is, the pressure of the sublimation sheet assembly 200/200a is raised to pressure P, released from pressure while the assembly is transferred between thermosetting environments, and again raised to pressure P.

Once the sublimation sheet assembly 200/200a has been placed within the second thermosetting environment 420, a manufacturer can close upper and lower platens 422, 424 around the sublimation sheet assembly 200/200a. In particular, the upper and lower platens 422, 424 can apply a pressure to the sublimation sheet assembly 200/200a. For example, FIG. 4 illustrates that the platens 422, 424 can apply a pressure P to the sublimation sheet assembly 200/200a. One will appreciate that pressure P applied to the sublimation sheet assembly 200/200a in the second thermosetting environment 420 can be equal to, or approximately equal to, the pressure P applied to the sublimation sheet assembly 200/200a in the first thermosetting environment 400.

Additionally, while in the second thermosetting environment 420, the upper and lower platens 422, 424 can subject the sublimation sheet assembly 200/200a to a second temperature T2 in order to cool the sublimation sheet assembly 200/200a to a release temperature. Thus, while in the second thermosetting environment 420, the sublimation sheet assembly 200/200a can undergo an active cooling phase, which returns the resin-based substrate 230 to a rigid state, capturing the dye below the surface of the resin-based substrate. Once the sublimation sheet assembly 200/200a, has been cooled to the temperature T2, a manufacturer can subsequently remove the assembly 200/200a from the second thermosetting environment 420 via a set of out-feed rollers 430. At this point, as shown in FIG. 5C, a manufacturer can remove the dye carriers 215 (i.e., the sheets previously holding the now-sublimated dye) and other layers of the sublimation sheet assembly 200/200a from the resin-based substrate 230 to form a finished decorative architectural resin panel 100.

While the methods described above in relation to FIG. 4 include the use of two thermosetting environments (i.e., a heating press and a cooling press), in additional implementations of the present invention, a single thermosetting environment can also be used. For instance, a single thermosetting environment can uniformly and simultaneously heat opposing sides of the sublimation sheet assembly 200/200a to temperature T1. Then the same thermosetting environment can cool the sublimation sheet assembly 200/200a to a temperature T2 by applying a temperature of T2 uniformly and simultaneously to the opposing sides of the sublimation sheet assembly 200/200a. In such implementations, the thermosetting environment can subject the sublimation sheet assembly 200/200a to a continuous pressure P during the entire sublimation process.

It will be understood that employing a single thermosetting environment and employing multiple thermosetting environments each provide respective advantages. For example, a single thermosetting environment, which is used to both heat and cool the sublimation sheet assembly 200/200a, requires less workspace than multiple thermosetting environments. On the other hand, multiple thermosetting environments can decrease production time and increase production capacity. Specifically, employing separate thermosetting environments to heat and cool the sublimation sheet assembly 200/200a eliminates the need to wait for a single machine to both heat up and cool down. Furthermore, when multiple thermosetting environments are utilized, a manufacturer can utilize all units simultaneously.

One will appreciate that the methods and apparatus described above in relation to FIGS. 4-5 can thus ensure that the sublimation sheet assembly 200/200a, and more particularly, the resin-based substrate 230 are not damaged during processing. For example, as illustrated in FIG. 4, implementations of the present invention can include roller-feeds 410, 416, 430 which can be used to transport the sublimation sheet assembly 200/200a between processing steps. The roller-feeds 410, 416, 430 can ensure that the sublimation sheet assembly 200/200a remains flat and is not bent or otherwise damaged during transportation. In addition, conveyor belts or other similar apparatus can also be used in the alternative to roller-feeds 410, 416, 430. Furthermore, and as previously mentioned, by applying uniform and simultaneous temperature to the extreme opposing surfaces of the sublimation sheet assembly 200/200a (during both heating and cooling of the resin-based substrates 230), a temperature gradient across the gauge of any resin-based substrate 230 of the sublimation sheet assembly 200/200a can be avoided/effectively eliminated. Avoiding such temperature gradients can ensure that the resin-based substrates 230 do not warp, bend, or otherwise deform due to the heat and pressure applied during the sublimation process.

Figure 6:
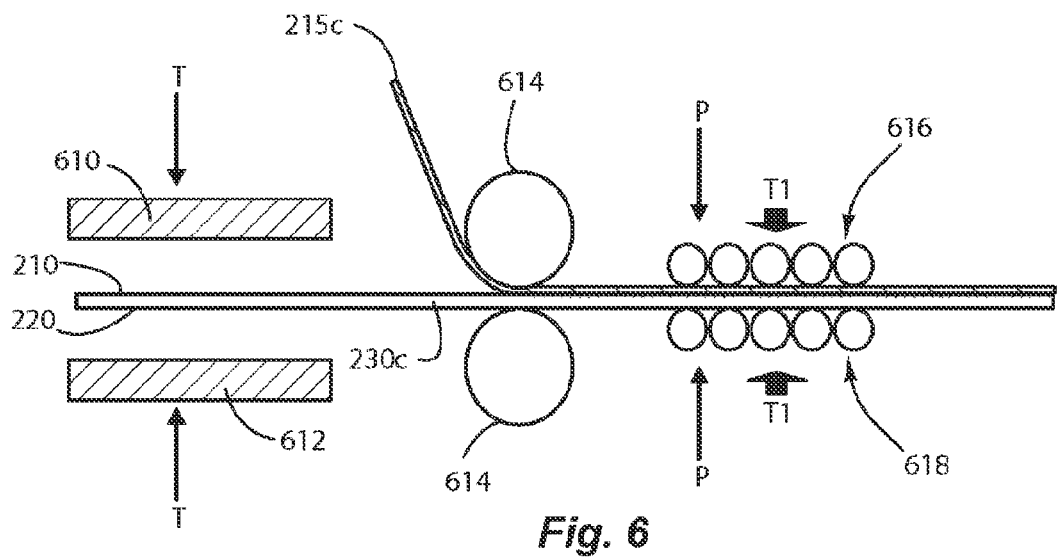
FIG. 6 illustrates a schematic view of a system for continuous feed dye-sublimation in accordance with an implementation of the present invention.

According to additional or alternative implementations of the present invention, the dye sublimation process can also be performed with a continuous process. For example, FIG. 6 illustrates an overview schematic diagram for coloring a resin-based substrate with a continuous process. In particular, FIG. 6 shows that a manufacturer can pre-heat a resin-based substrate 230c between heating elements 610, 612. It will be noted that the heating elements 610, 612 can heat opposing upper and lower surfaces 210, 220 of the resin-based substrate 230c uniformly and simultaneously to avoid the creation of a non-uniform temperature gradient across the thickness or gauge of the substrate 230c. Once the resin-based substrate 230c has been pre-heated, a dye carrier 215c can be applied to at least one of the surfaces 210, 220 of the substrate 230c. For example, FIG. 6 shows that the dye carrier 215c can be applied to the resin-based substrate 230c from at least one set of rolls 614. The at least one set of rolls 614 can maintain dye carrier 215c at the operative temperature required for image transfer (i.e., a temperature above the dye sublimation temperature).

After the dye carrier 215c has been applied to at least one surface 210, 220 of the resin-based substrate 230c, dye carrier 215c and the resin-based substrate 230c can be pressed at a pressure P between nip rollers 616 and 618. The rollers 616 and 618 can also apply a temperature T1 to both opposing surfaces of the resin-based substrate 230c. Once the dye carrier 215c and the resin-based substrate 230c have reached temperature T1, the dye from the dye carrier can sublimate into one or more surfaces 210, 220 of the resin-based substrate 230c as described above in relation to FIGS. 5A-C.

As discussed above, the applied temperature T1 is a temperature above the dye sublimation temperature of the dye, and at or above the $T_g$ of the resin-substrate (e.g., 230c) being decorated. Usually temperature T1 will be between about 350° F. and about 450° F. and more preferably between about 375° F. and about 425° F. Additionally, pressure P is a pressure sufficient to provide the needed contact force between a dye carrier and a surface of a substrate to allow the dye to sublimate into the surface and remove air from the interface surface between the dye carrier and the substrate. The pressure P can be between approximately 5 psi and approximately 250 psi, and preferably between about 5 psi and about 50 psi.

Once the dye from the dye carrier 215c has sublimated a desired depth into the surface(s) 210, 220 of the resin-based substrate 230c, subsequent rollers (not shown) can actively cool the resin-based substrate 230c to a release temperature. Or, in the alternative, the manufacturer can position the product so that ambient air can cool the resin-based substrate 230c. In general, a manufacturer can supply ambient air equally and simultaneously to both surfaces 210, 220 of the resin-based substrate 230c.

Figure 7:
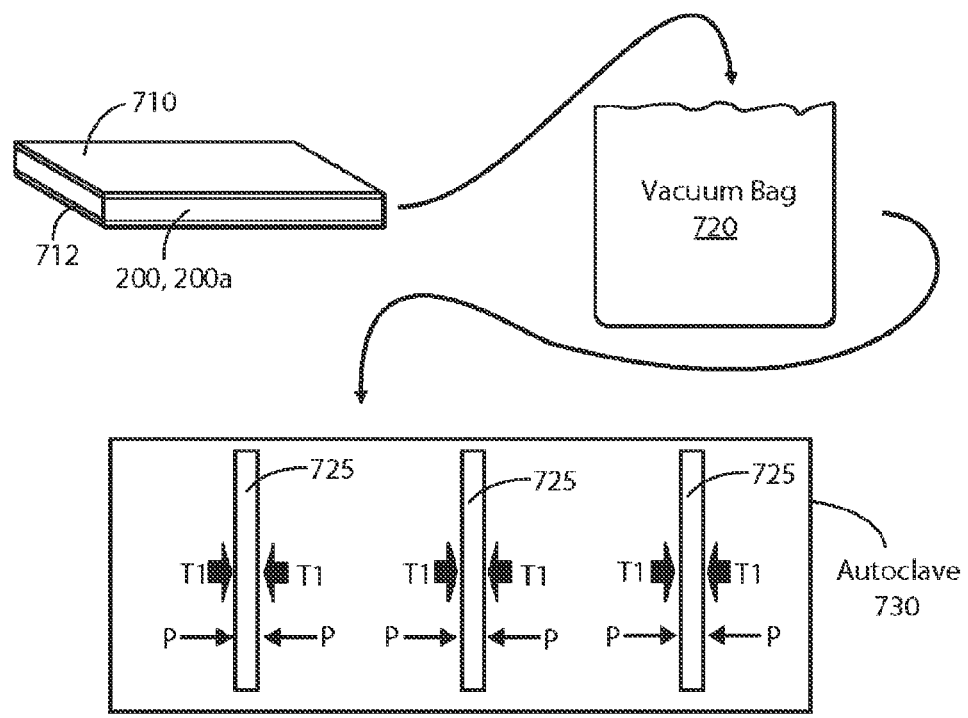
FIG. 7 illustrates a schematic view of a system for imparting a dye sublimated image on a resin-based substrate with an autoclave in accordance with an implementation of the present invention.

In addition to the foregoing, implementations of the present invention further include methods, mechanisms, and apparatus for creating a dye sublimated product with an autoclave assembly. For example, FIG. 7 illustrates an overview schematic diagram for one method of creating a dye-sublimated product with an autoclave. As shown in FIG. 7, a manufacturer can place a first distribution plate 710 over the top of the sublimation sheet assembly 200/200a and a second distribution plate 712 below the sublimation sheet assembly 200/200a. The distribution plates 710, 712 can comprise metal sheets. In other implementations, the distribution plates 710, 712 can comprise glass sheets. Glass distribution plates 710, 712 may be preferable over metal distribution plates in vacuum/autoclave-based processes because they tend to more remain flat and rigid over time than metal, and tend to be more scratch and dent resistant than metal, resulting in a smoother, more uniform substrate surface. The manufacturer can use the distribution plates 710, 712 in addition to, or as an alternative to the pressure distribution plates 420.

After placing the distribution plates 710, 712 about the sublimation sheet assembly 200/200a, the manufacturer can place the sublimation assembly 200/200a in a corresponding vacuum bag 720. In particular, the manufacturer can first lay down a vacuum bag 720 on a surface. The manufacturer then places the sublimation sheet assembly 200/200a together with the distribution plates 710, 712 inside of the vacuum bag 720, and closes the vacuum bag 720 to form a vacuum bag assembly 725. The manufacturer then seals the edges of the assembly, and attaches a vacuum nozzle (not shown) to the vacuum bag 720 to allow for air removal from the vacuum bag assembly. The manufacturer then places one or more vacuum bag assemblies 725 within the autoclave 730. The manufacturer then operates the autoclave 730, which applies equal heat and pressure P in all directions on the sublimation sheet assembly 200/200a and any resin-based substrate 230 included therein.

In one implementation, the pressure P can be between approximately 5 psi and approximately 250 psi. When PETG is used as the material for the resin-based substrate 230, the surface temperature T1, as measured by a thermocouple, will generally reach 390-400° F. for dye sublimation to occur. Similarly, the pressure P is between about 5 psi to about 250 psi, and preferably between about 15 psi to about 50 psi.

In general, the autoclave 230 can heat the sublimation sheet assembly 200/200a (e.g., via a convection process, rather than via conduction as with a mechanical press) with a controlled temperature profile. In particular, the manufacturer sets the temperature of the autoclave 730 to reach a temperature T1. As discussed above with regards to the other implementations, T1 is a temperature (appropriate for the given materials in the sublimation assemblies 200/200a) above or at the relevant dye sublimation temperature of the dye and about the $T_g$ of the resin substrate. In one implementation, temperature T1 will be between about 350° F. and about 450° F. As shown in FIG. 7, the autoclave 730 can apply temperature T1 uniformly and simultaneously to all six sides of each vacuum bag assembly. Thus, the autoclave 730 can ensure that a temperature gradient is avoided in the given vacuum bag assembly 725, and therefore, also any warping or other distortions of the panel and/or sublimated image during processing.

Furthermore, the avoidance of a temperature gradient is additionally at least in part due to the essentially symmetrical nature of the sublimation sheet assembly 200/200a and the vacuum bag assembly 725. In particular, the symmetry (virtually regardless of the number of dye carrier sheets used, which have nominal thickness) of the vacuum bag assembly 725 can ensure equal rates of heat transfer from each side of the assembly 725 in toward its center. The equal heat transfer is also due at least in part to the fact that each sublimation sheet assembly 200/200a is held between distribution plates 710, 712 (e.g., rather than being placed on a table or surface that can restrict the heat transfer to that side).

Once the vacuum bag assembly 725 has reached pressure P and temperature T1, any resin-based substrate 230 can undergo the changes described herein above in relation to FIGS. 5A-5D. In particular, dye can sublimate into each surface of each resin-based substrate 230, next to which a manufacturer has placed a dye carrier 215. Furthermore, by ensuring that no temperature gradient is created through the thickness of the assembly, a manufacturer can ensure that the dye sublimates evenly and without distortion into the one or more surfaces of the resin-based substrates 230.

One will appreciate that the autoclaving process can provide a number of additional benefits for creating an appropriate, aesthetically pleasing, dye-sublimated decorative architectural resin panel 100. For example, autoclaving is typically not constrained to one size/format (i.e., an autoclave can process a 2'×4' piece at the same time as an 8'×10' piece). In addition, in the autoclaving process, pressure can be continuous throughout heating and cooling cycles. This continuous pressure can keep the sublimation sheet assembly 200/200a flat throughout the heating and cooling cycles, which can eliminate bowing. Further along these lines, autoclaving is a convective heating process that allows for more controlled heating and cooling at each direction about the sublimation assembly, and thus allows for equal temperatures at the same depth throughout each corresponding substrate's thickness. Again, since the temperature, and pressure, is uniformly distributed throughout each substrate, the autoclave can process multiple different sublimation assemblies without any warping/bowing, etc.

In addition to an autoclave process, yet another implementation for heating and pressurizing a sublimation sheet assembly 200/200a can include use of a vacuum press. In particular and as previously mentioned with respect to the autoclave process, a manufacturer can prepare a vacuum bag assembly 725. A manufacturer can then position the vacuum bag assembly 725 into a vacuum press, and apply the same temperatures T1 and pressures P uniformly and simultaneously to opposing sides of the given sublimation assembly 725 to enable dye sublimation without warping. In another application of a vacuum press, a dye sublimation assembly that has not been bagged can be positioned inside a vacuum press chamber, where air is evacuated prior to application of mechanical pressure.

Figure 8:
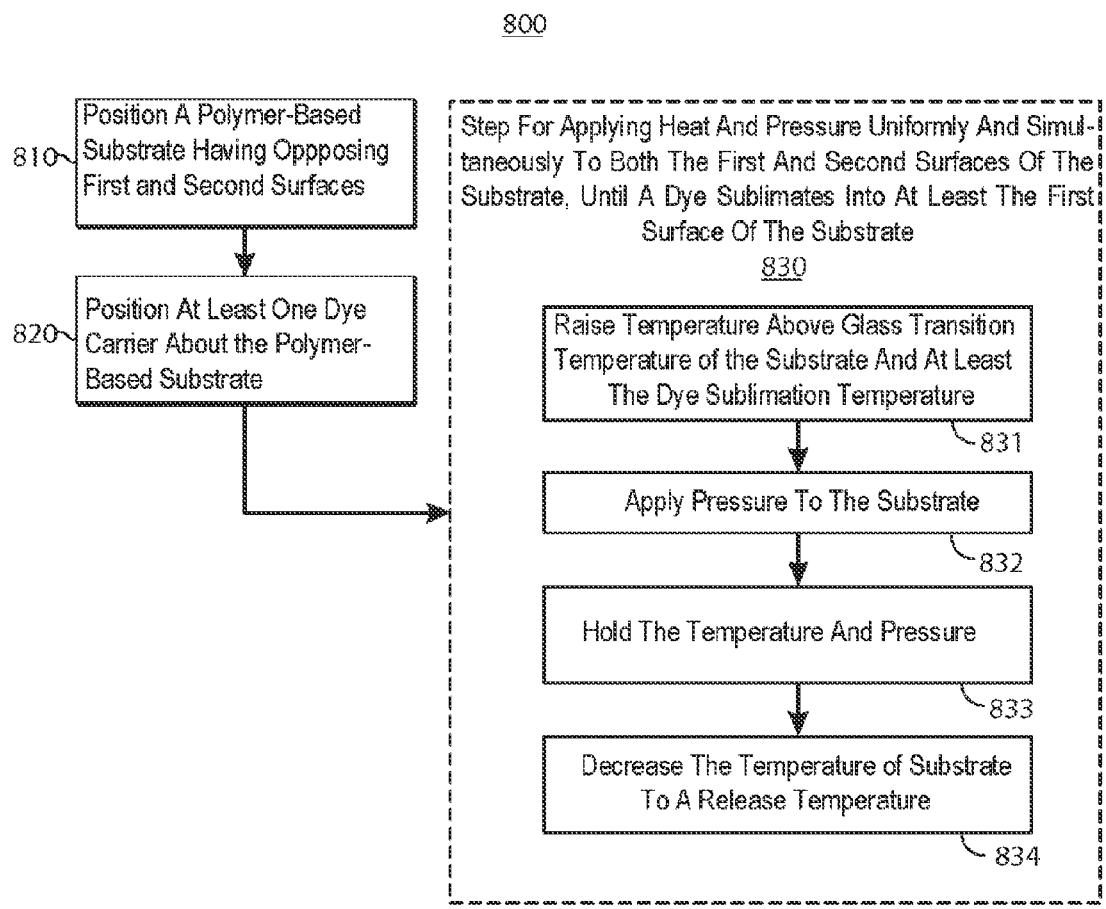
FIG. 8 illustrates a chart of acts and steps in a method of decorating a resin substrate by employing dye sublimation techniques in accordance with an implementation of the present invention.
Figure 5A:
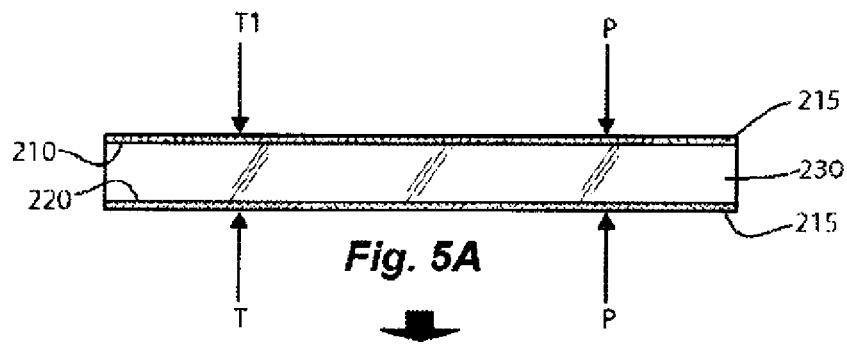
Figure 5B:
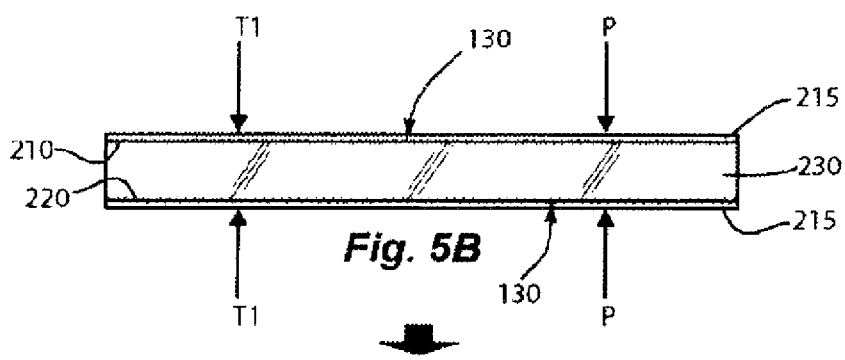
Figure 5C:
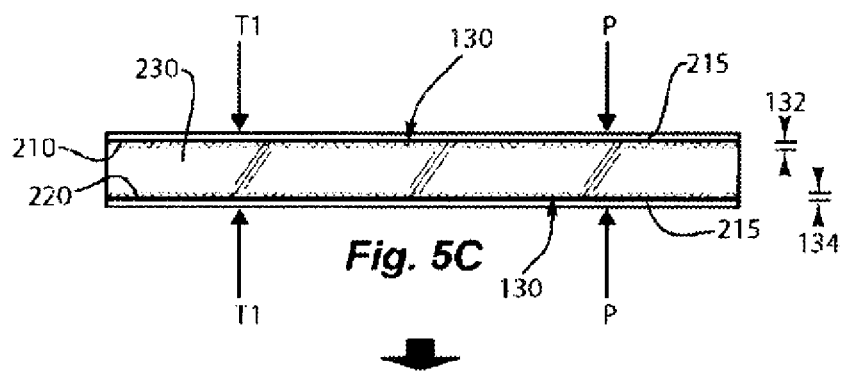
Figure 5D:
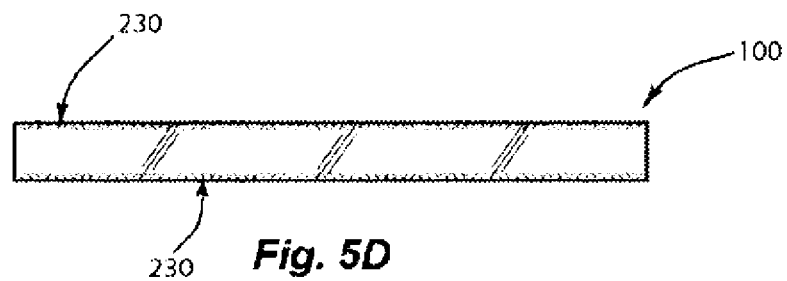
Figure 5A:
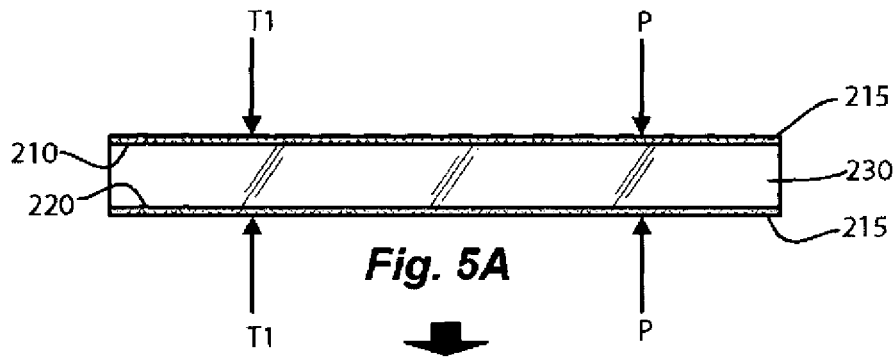
Figure 5B:
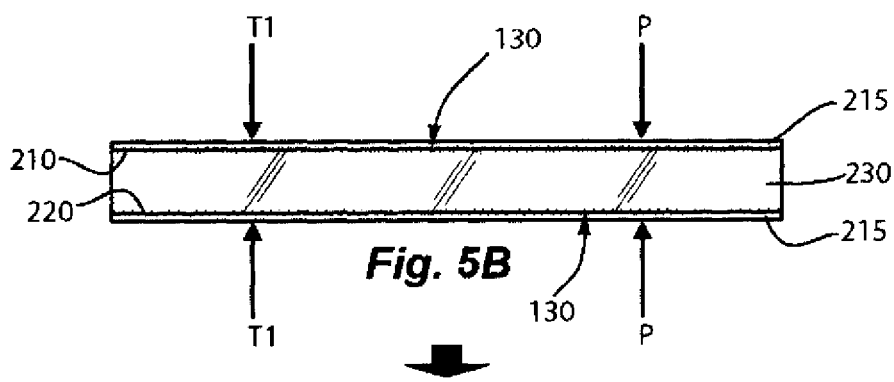
Figure 5C:
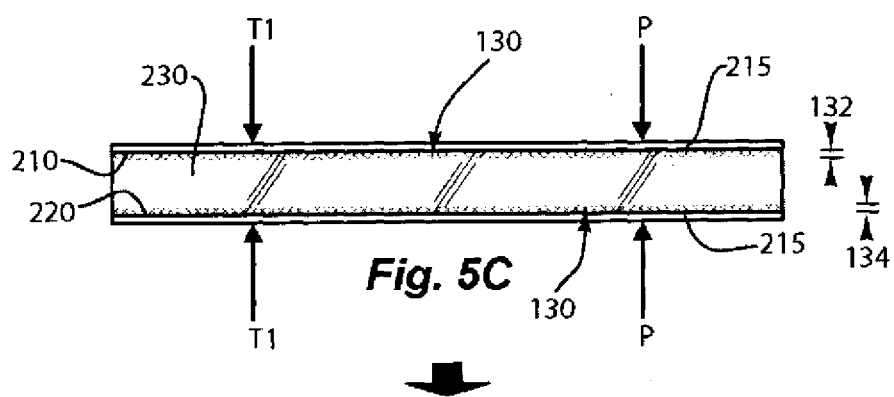
Figure 5D:
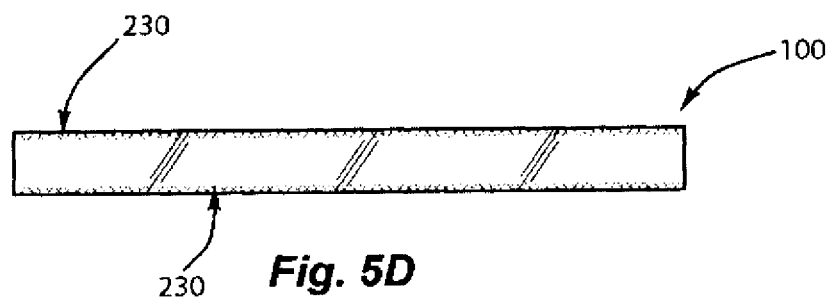

Accordingly, FIGS. 1A-7, and the corresponding text, provide a number of different components and mechanisms for sublimating surfaces of a panel in an efficient, aesthetically pleasing way. In addition to the foregoing, implementations of the present invention can also be described in terms of flowcharts comprising acts and steps in a method for accomplishing a particular result. For example, FIG. 8 illustrates a flowchart of one exemplary method 800 for producing a decorative architectural resin panel 100 having a dye sublimated image on opposing sides in accordance with the principles of the present invention. The acts of FIG. 8 are described below with reference to the components and diagrams of FIGS. 1A through 7.

For example, FIG. 8 shows that the method 800 of creating a decorative architectural resin panel 100 having one or more surfaces including a dye sublimated color or image can include an act 810 of positioning a resin-based substrate 230, having opposing surfaces 210, 220. Act 810 includes positioning one or more substantially translucent or transparent resin-based substrates 230 on a surface. For example, a manufacturer positions a first resin-based substrate 230 on a surface such as a manufacturing table.

In addition, FIG. 8 shows that the method 800 can comprise an act 820 of positioning at least one dye carrier 215 about the resin-based substrate 230. Act 820 includes positioning at least one dye carrier 215 against a first surface 210 of the resin-based substrate 230. For example, the manufacturer places a dye carrier 215 on top of a first surface 210 of resin-based substrate 230, such that the dye carrier 215 substantially covers the entire surface area of the first surface 210. In one implementation, the act 820 can further comprise positioning a second dye carrier 215 about or adjacent a second surface 220 of the resin-based substrate 230, which opposes the first surface 210.

One will appreciate that the one or more dye carriers 215 can include an image or solid color formed thereon with sublimation dyes. The one or more dye carriers 215 will thus be positioned against one or more opposing surfaces 210, 220 of the resin-based substrate 230 and the combination thereof, along any other layers as described in relation to FIGS. 2A-2B and 3A-3B, will form a sublimation sheet laminate assembly, such as sublimation sheet assembly 200/200a. Additionally, the act 820 can further include creating a sublimation sheet assembly 200/200a that is symmetrical about its center layer.

FIG. 8 further shows that the method can comprise an act 830 of applying heat and pressure uniformly and simultaneously to both the first and second surfaces of the substrate, until a dye sublimates into at least the first surface of the substrate. In particular, step 830 includes processing the sublimation sheet assembly 200/200a such that the one or more dye carriers 215 sublimate an image, solid color, or color gradient into one or more surfaces 210, 220 of the resin-based substrate 230. For example, sublimation sheet assembly 200/200a is subjected to one or more pressures and temperatures that cause the dye of the dye carriers 215 to transition from a solid state directly into a vapor state, and infuse or sublimate into the one or more surfaces 210, 220 of the resin-based substrate 230 to form a decorative architectural resin panel 100. This is done without damaging the resin-based substrate 230, by for example, warping, bowing, or other deformation.

Although act 830 can comprise any number or order of corresponding acts for accomplishing the desired result, FIG. 8 shows that act 830 comprises at least an act 831 of raising the temperature of the sublimation sheet assembly 200/200a above the $T_g$ of the resin-based substrate 230 and at least the dye sublimation temperature of the dye in one or more of the dye carriers 215. Act 831 comprises placing the sublimation sheet assembly 200/200a within a first thermosetting environment 400, such as a press, and adjusting the temperature of upper and lower platens 412, 414 until the temperature of the sublimation sheet assembly 200/200a reaches temperature T1. In this case, temperature T1 comprises a temperature above the $T_g$ of the materials of the resin-based substrate 230 and the dye sublimation temperature of the dye in the dye carriers 215.

In at least another implementation, act 831 can comprise heating the resin-based substrate 230 between heating elements 610, 612 and then subjecting the resin-based substrate 230 and the one or more dye carriers 215 to heat provided by nip rollers 616, 618 until the temperature of the resin-based substrate 230 and the one or more dye carriers reaches temperature T1. According to yet another implementation of the present invention, act 831 can comprise placing sublimation sheet assembly 200/200a within a vacuum bag and then heating the vacuum bag and its contents to temperature T1. In one implementation, the vacuum bag and its contents can be heated within an autoclave. In another implementation, the vacuum bag and its contents can be heated within a vacuum press. In another implementation, the sublimation sheet assembly 200/200a can be heated in a vacuum press without a vacuum bag.

One will appreciate, however, whether employing a thermosetting environment, heating elements and heated rollers, an autoclave, or a vacuum press to heat the sublimation sheet assembly 200/200a to temperature T1, the heat can be uniformly and simultaneously applied to both opposing extreme surfaces of the sublimation sheet assembly 200/200a. Thus, the heat can be uniformly and simultaneously applied to both opposing surfaces 210, 220 of the resin-based substrate 230 via the layers of the sublimation sheet assembly 200/200a.

FIG. 8 also shows that act 830 comprises an act 832 of applying pressure P to the sublimation sheet assembly 200/200a. In general, the pressure P (as noted throughout this description) is a pressure sufficient to provide the needed contact force between a dye carrier and a surface of a substrate to allow the dye to sublimate into the surface and also evacuates air between the dye carrier and surface of the substrate. In one implementation, the pressure P can be between approximately 5 psi and approximately 250 psi, and preferably between about 5 psi and about 50 psi. Similar to act 831, act 832 can be performed in a thermosetting environment, via the use of rollers, in an autoclave, or in a vacuum press, each as described herein above in relation to FIGS. 3-7. In the implementations in which a vacuum bag is used, act 832 can further comprise the act of evacuating air from the vacuum bag prior to placing it within an autoclave or vacuum press. Additionally, acts 831 and 832 can be performed simultaneously.

In addition, FIG. 8 shows that act 830 can comprise an act 833 of holding sublimation sheet assembly 200/200a at the temperature and pressure reached in acts 831 and 832 for period of time. The temperature and pressure reached in acts 831 and 832 can be held in act 833 until a dye sublimates into at least the first surface 210 of the resin-based substrate 230. More specifically, the temperature and pressure can be held until a dye has sublimated partly into the first surface of the resin-based substrate 230 to a first sublimation depth 232. In particular, the temperature T1 and pressure P can be held in act 833 for a period of about 30 seconds to about 5 minutes, and more preferably, between approximately 1 to 2 minutes.

Furthermore, FIG. 8 shows that act 830 can include an act 834 of decreasing the temperature of the sublimation sheet assembly 200/200a to a release temperature. Similar to act 831, act 832 can be performed in a thermosetting environment, with cooled rollers, in an autoclave, or a vacuum press. Furthermore, act 834 can be performed at ambient room conditions. One will appreciate, however, whether using a thermosetting environment, rollers, an autoclave, or a vacuum press to cool the sublimation sheet assembly 200/200a, the heat used (or lack thereof) can be uniformly and simultaneously applied to both opposing extreme surfaces of the sublimation sheet assembly 200/200a. Thus, any heat (or lack thereof) can be uniformly and simultaneously applied to both opposing surfaces 210, 220 of the resin-based substrate 230 via the layers of the sublimation sheet assembly 200/200a. More specifically, act 834 can comprise lowering the temperature of the sublimation sheet assembly 200/200a so that the given sublimation sheet assembly 200/200a undergoes an active cooling phase, to return the resin-based substrate 230 to a rigid state, capturing the dye below the surface of the resin-based substrate 230.

Although not shown, a manufacturer can also perform an act of coating (e.g., with 3FORM PATINA 2K specialty coating) any or all surfaces of the decorative panel 100 (e.g., after laminating and thermoforming processes when the panel is in final product form). In one implementation, the spray coating comprises an aliphatic acrylic urethane coating containing silica powder, which provides the laminate panel with added protection against physical, light-based, and chemical damage. Spray-coating also allows the laminate panel surface to be more easily re-finished in the event of any marring/damage.

Accordingly, the schematics and methods described herein provide a number of unique products, as well as ways for creating aesthetically pleasing, decorative, architecturally-suitable resin-based panels including dye sublimated images, color layers, or color gradients. As discussed herein, these resin panels can be substantially translucent or transparent in order to provide a desired aesthetic. Furthermore, the implementations of the present invention provide methods of creating decorative, architecturally-suitable resin-based panels without damaging the panels during processing.

In particular, implementations of the present invention can create structurally useful panels with excellent aesthetic characteristics, which have no bowing, warping, or edge rollover, since they were created in a manner that avoids non-uniform temperature and pressure gradients during the dye sublimation process. As mentioned, this can be accomplished by providing an essentially symmetric sublimation sheet assembly for dye sublimation that is symmetrical about its center layer, applying heat and pressure uniformly and simultaneously to opposing surface of the assembly, and ensuring that each surface has equal exposure to any heat source. By ensuring that the panels do not warp, bow, or bend during processing due to a temperature or pressure gradient, implementations of the present invention also ensure that any image sublimated into the panel is not stretched, shrunk, offset, or otherwise distorted.

In addition to the foregoing, one will appreciate that panels made in accordance with the present invention can be formed to a wide variety of shapes and dimensions. In addition, the structures and processes described herein can be deviated in any number of ways within the context of implementations of the present invention. For example, the dye carrier can be combined with a textured paper known in the art of resin panel manufacture or variation thereof. With such textured paper, the resin-based substrate can receive both dye and texture simultaneously applying the methods of the present invention. Alternatively, the printed substrate can simultaneously be laminated and textured with methods known in the art.

The present invention may thus be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A decorative architectural resin panel, comprising:
a resin sheet having a thickness defined by a distance that is perpendicular to first and second opposing surfaces;
a first sublimated dye that covers the entire first surface, and extends by a first sublimation depth only partly into the thickness of the resin sheet; and
a second sublimated dye that covers the entire second surface, and extends by a second sublimation depth only partly into the thickness of the resin sheet;
wherein the first and second sublimation depths are separated by a portion of the thickness of the resin sheet containing no sublimated dye.

2. The panel as recited in claim 1, wherein the combined first sublimation depth and the second sublimation depth comprise less than all of the thickness of the resin sheet.

3. The panel as recited in claim 1, wherein:
the dye covering the first surface forms an image; and
the dye covering the second surface forms a complementary image.

4. The panel as recited in claim 3, wherein at least one of the images covering the first and second surfaces comprises a solid color covering the entire surface area of the first or second surface.

5. The panel as recited in claim 3, wherein at least one of the images covering the first and second surfaces comprises a color-to-color or color-to-clear faded image covering the entire surface area of the first or second surface.

6. The panel as recited in claim 1, wherein the dye provides the decorative architectural resin panel with an effect of depth.

7. The panel as recited in claim 1, wherein the resin sheet comprises one of polyvinyl chloride, poly (methyl methacrylate), thermoplastic polyester or co-polyester, polyurethane, cellulose-based thermoplastic, or polycarbonate.

8. The panel as recited in claim 1, wherein the decorative resin panel comprises a texture on one or more outside surfaces.

9. The panel as recited in claim 1, wherein the resin sheet is substantially translucent.

10. The panel as recited in claim 9, wherein the laminate of multiple resin-based substrates comprises resins selected from the group consisting of polycarbonate, polyester, PVC, acrylic, and combinations and polymer alloys thereof.

11. The panel as recited in claim 1, wherein the resin sheet comprises a laminate of multiple resin substrates.

12. The panel as recited in claim 1, wherein the combined sublimation depths of the first and second dye is no more than fifteen-sixteenths of the thickness of the resin sheet.

13. A decorative architectural resin panel, comprising:
   a resin sheet having a thickness defined by a distance that is perpendicular to first and second opposing surfaces;
   a first sublimated dye that covers the entire first surface, and extends by a first sublimation depth only partly into the thickness of the resin sheet; and
   a second sublimated dye that covers the entire second surface, and extends by a second sublimation depth only partly into the thickness of the resin sheet;
   wherein:
      the first and second sublimation depths are separated by a portion of the thickness of the resin sheet containing no sublimated dye; and
      the decorative resin panel comprises a texture on one or more outside surfaces.

14. The panel as recited in claim 13, wherein:
   the dye covering the first surface forms an image; and
   the dye covering the second surface forms a complementary image.

15. The panel as recited in claim 14, wherein at least one of the images covering the first and second surfaces comprises a solid color covering the entire surface area of the first or second surface.

16. The panel as recited in claim 14, wherein at least one of the images covering the first and second surfaces comprises a color-to-color or color-to-clear faded image covering the entire surface area of the first or second surface.

17. The panel as recited in claim 13, wherein the dye provides the decorative architectural resin panel with an effect of depth.

18. The panel as recited in claim 13, wherein the resin sheet comprises one of polyvinyl chloride, poly (methyl methacrylate), thermoplastic polyester or co-polyester, polyurethane, cellulose-based thermoplastic, polycarbonate, or combinations and polymer alloys thereof.

19. The panel as recited in claim 13, wherein the resin sheet is substantially translucent.

20. The panel as recited in claim 13, wherein the resin sheet comprises a laminate of multiple resin-based substrates.

21. The panel as recited in claim 13, wherein the combined sublimation depths of the first and second dye is no more than fifteen-sixteenths of the thickness of the resin sheet.

22. A decorative architectural resin panel, comprising:
   a resin sheet having a thickness defined by a distance that is perpendicular to first and second opposing surfaces;
   a first sublimated dye that covers the entire first surface, and extends by a first sublimation depth only partly into the thickness of the resin sheet; and
   a second sublimated dye that covers the entire second surface, and extends by a second sublimation depth only partly into the thickness of the resin sheet;
   wherein:
      the first and second sublimation depths are separated by a portion of the thickness of the resin sheet containing no sublimated dye; and
      the resin sheet comprises one of polyvinyl chloride, poly (methyl methacrylate), thermoplastic polyester or co-polyester, polyurethane, cellulose-based thermoplastic, polycarbonate, or combinations and polymer alloys thereof.

23. The panel as recited in claim 22, wherein the resin sheet is substantially translucent.

24. The panel as recited in claim 22, wherein the decorative resin panel comprises a texture on one or more outside surfaces.

25. The panel as recited in claim 22, wherein the dye provides the decorative architectural resin panel with an effect of depth.

26. The panel as recited in claim 22, wherein the combined sublimation depths of the first and second dye is no more than fifteen-sixteenths of the thickness of the resin sheet.

27. The panel as recited in claim 22, wherein:
   the dye covering the first surface forms an image; and
   the dye covering the second surface forms a complementary image.

28. The panel as recited in claim 27, wherein at least one of the images covering the first and second surfaces comprises a solid color covering the entire surface area of the first or second surface.

29. The panel as recited in claim 27, wherein at least one of the images covering the first and second surfaces comprises a color-to-color or color-to-clear faded image covering the entire surface area of the first or second surface.

\* \* \* \* \*

UNITED STATES PATENT AND TRADEMARK OFFICE
CERTIFICATE OF CORRECTION

PATENT NO. : 8,546,302 B2  
APPLICATION NO. : 13/445507  
DATED : October 1, 2013  
INVENTOR(S) : Langan et al.

Page 1 of 3

It is certified that error appears in the above-identified patent and that said Letters Patent is hereby corrected as shown below:

In the Drawings

Delete the drawing sheet 5, and substitute the attached drawing sheet 5 therefor Sheet 7, replace Figure 8 with the figure depicted below, wherein the description of act 810 is changed from "Position A Polymer-Based Substrate Having Oppposing First and Second Surfaces" to --Position A Resin-Based Substrate Having Opposing First and Second Surfaces-- and the description of act 820 is changed from "Position At Least One Dye Carrier About the Polymer-Based Substrate" to --Position At Least One Dye Carrier About the Resin-Based Substrate-- (As shown below)

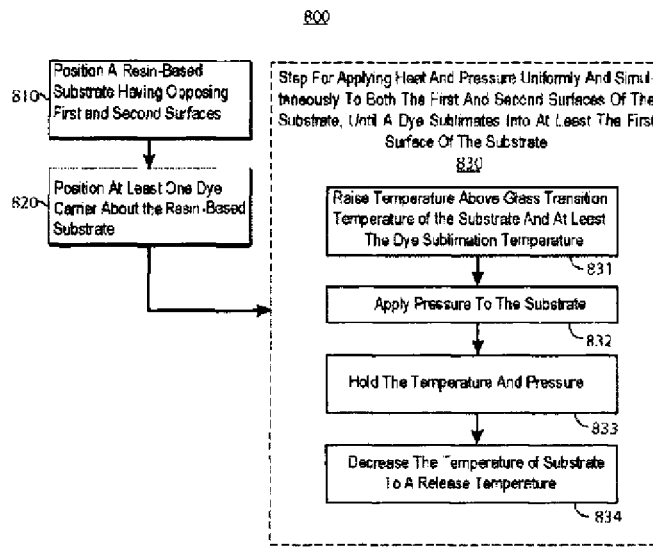

Fig. 8

Signed and Sealed this  
First Day of April, 2014

Michelle K. Lee  
*Deputy Director of the United States Patent and Trademark Office*

CERTIFICATE OF CORRECTION (continued)
U.S. Pat. No. 8,546,302 B2

In the Specification

Column 1
Line 24, change "processes, for" to --processes for--
Line 34, change "which can formed" to --which can be formed--

Column 4
Line 46, change "FIG. 1" to --FIG. 1A--
Line 63, change "FIGS. 5A-D" to --FIGS. 5A-5D--

Column 5
Line 61, change "means a substrate" to --mean a substrate--

Column 6
Line 12, change "number other layers" to --number of other layers--
Line 25, change "two inches (2") inches" to --two inches (2")--
Line 64, change "opposing sides 110,120" to --opposing sides 110 and 120--

Column 7
Line 6, change "surface 120 be" to --surface 120 to be--
Line 31, change "132, 134" to --132 and 134--

Column 9
Line 55, change "plates 240(*a-b*)" to --plates 240*a*, 240*b*--

Column 10
Line 22, change "dye carrier can only be placed against" to --dye carrier 215 can also be placed only against--

Column 15
Line 24, change "FIGS. 5A-C" to --FIGS. 5A-5C--
Line 48, change "dye sublimated product" to --dye-sublimated product--
Line 64, change "distribution plates 420" to --distribution plates 240--

Column 16
Line 22, change "autoclave 230" to --autoclave 730--

Column 19
Lines 16-17, change "for period of time" to --for a period of time--
Line 22, change "depth 232" to --depth 132--
Line 29, change "act 832" to --act 834--

Column 20
Line 10, change "to opposing surface" to --to opposing surfaces--

UNITED STATES PATENT AND TRADEMARK OFFICE
CERTIFICATE OF CORRECTION

PATENT NO. : 8,546,302 B2
APPLICATION NO. : 13/445507
DATED : October 1, 2013
INVENTOR(S) : Langan et al.

Page 1 of 3

It is certified that error appears in the above-identified patent and that said Letters Patent is hereby corrected as shown below:

In the Drawings

Delete the drawing sheet 5, and substitute the attached drawing sheet 5 therefor Sheet 7, replace Figure 8 with the figure depicted below, wherein the description of act 810 is changed from "Position A Polymer-Based Substrate Having Oppposing First and Second Surfaces" to --Position A Resin-Based Substrate Having Opposing First and Second Surfaces-- and the description of act 820 is changed from "Position At Least One Dye Carrier About the Polymer-Based Substrate" to --Position At Least One Dye Carrier About the Resin-Based Substrate-- (As shown below)

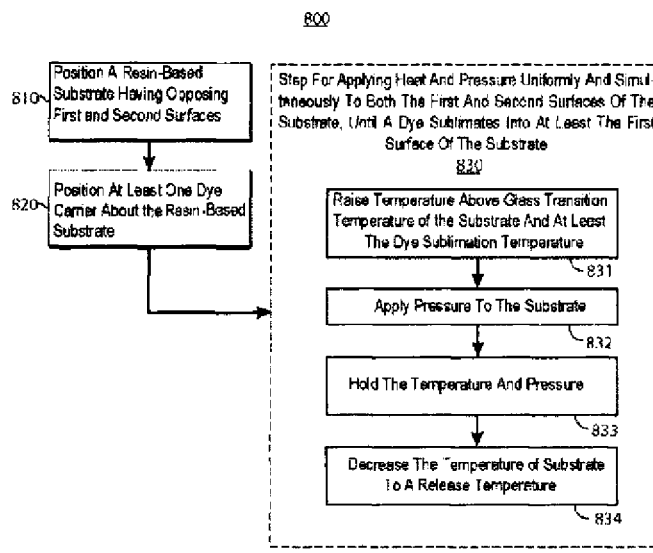

Fig. 8

This certificate supersedes the Certificate of Correction issued April 1, 2014.

Signed and Sealed this
First Day of July, 2014

Michelle K. Lee
*Deputy Director of the United States Patent and Trademark Office*

CERTIFICATE OF CORRECTION (continued)
U.S. Pat. No. 8,546,302 B2

In the Specification

Column 1
Line 24, change "processes, for" to --processes for--
Line 34, change "which can formed" to --which can be formed--

Column 4
Line 46, change "FIG. 1" to --FIG. 1A--
Line 63, change "FIGS. 5A-D" to --FIGS. 5A-5D--

Column 5
Line 61, change "means a substrate" to --mean a substrate--

Column 6
Line 12, change "number other layers" to --number of other layers--
Line 25, change "two inches (2") inches" to --two inches (2")--
Line 64, change "opposing sides 110,120" to --opposing sides 110 and 120--

Column 7
Line 6, change "surface 120 be" to --surface 120 to be--
Line 31, change "132, 134" to --132 and 134--

Column 9
Line 55, change "plates 240(*a-b*)" to --plates 240*a*, 240*b*--

Column 10
Line 22, change "dye carrier can only be placed against" to --dye carrier 215 can also be placed only against--

Column 15
Line 24, change "FIGS. 5A-C" to --FIGS. 5A-5C--
Line 48, change "dye sublimated product" to --dye-sublimated product--
Line 64, change "distribution plates 420" to --distribution plates 240--

Column 16
Line 22, change "autoclave 230" to --autoclave 730--

Column 19
Lines 16-17, change "for period of time" to --for a period of time--
Line 22, change "depth 232" to --depth 132--
Line 29, change "act 832" to --act 834--

Column 20
Line 10, change "to opposing surface" to --to opposing surfaces--